US010127303B2

(12) United States Patent
Adams et al.

(10) Patent No.: US 10,127,303 B2
(45) Date of Patent: Nov. 13, 2018

(54) MEASURING AND DISPLAYING FACETS IN CONTEXT-BASED CONFORMED DIMENSIONAL DATA GRAVITY WELLS

(71) Applicant: International Business Machines Corporation, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/190,361

(22) Filed: Jun. 23, 2016

(65) Prior Publication Data

US 2016/0299962 A1    Oct. 13, 2016

Related U.S. Application Data

(63) Continuation of application No. 14/695,247, filed on Apr. 24, 2015, now Pat. No. 9,449,073, which is a
(Continued)

(51) Int. Cl.
*G06F 17/30* (2006.01)
*G06F 17/27* (2006.01)
*G06N 7/00* (2006.01)

(52) U.S. Cl.
CPC ...... *G06F 17/30598* (2013.01); *G06F 17/271* (2013.01); *G06F 17/30011* (2013.01);
(Continued)

(58) Field of Classification Search
CPC ............ G06F 17/30598; G06F 17/271; G06F 17/30011; G06F 17/30312;
(Continued)

(56) References Cited

U.S. PATENT DOCUMENTS

| 5,450,535 A | 9/1995 | North |
| 5,664,179 A | 9/1997 | Min et al. |

(Continued)

FOREIGN PATENT DOCUMENTS

| CN | 101866342 A | 10/2010 |
| CN | 102201043 | 9/2011 |

(Continued)

OTHER PUBLICATIONS

U.S. Appl. No. 13/861,058 Non-Final Office Action dated Apr. 25, 2016.
(Continued)

*Primary Examiner* — Hares Jami
(74) *Attorney, Agent, or Firm* — Law Office of Jim Boice

(57) ABSTRACT

A processor-implemented method, system, and/or computer program product measures and displays facets in context-based conformed dimensional data gravity wells. Conformed dimensional objects and synthetic context-based objects are parsed into n-tuples. A virtual mass of each parsed object is calculated, in order to define a shape of multiple context-based conformed dimensional data gravity wells that are created when data objects that are pulled into each of the context-based conformed dimensional data gravity well frameworks on a context-based conformed dimensional gravity wells membrane. Data from the multiple context-based conformed dimensional data gravity wells then populates nodes in a data model. A displayed appearance of the particular context-based conformed dimensional data gravity well is dynamically adjusted according to how many parsed synthetic context-based objects are pulled into the particular context-based conformed dimensional data gravity well.

20 Claims, 12 Drawing Sheets

Related U.S. Application Data continuation of application No. 13/756,051, filed on Jan. 31, 2013, now Pat. No. 9,069,752.

(52) U.S. Cl.
CPC .. *G06F 17/30312* (2013.01); *G06F 17/30516* (2013.01); *G06F 17/30528* (2013.01); *G06F 17/30592* (2013.01); *G06F 17/30867* (2013.01); *G06N 7/005* (2013.01)

(58) Field of Classification Search
CPC ......... G06F 17/30516; G06F 17/30528; G06F 17/30592; G06F 17/30737; G06F 17/30867; G06N 7/005
USPC .............................. 707/705, 737, 756, 755
See application file for complete search history.

(56) References Cited

U.S. PATENT DOCUMENTS

| | | |
|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,167,405 A | 12/2000 | Rosensteel et al. |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,353,818 B1 | 3/2002 | Carino, Jr. |
| 6,381,611 B1 | 4/2002 | Roberge et al. |
| 6,405,162 B1* | 6/2002 | Segond ................ G06F 17/274 704/9 |
| 6,424,969 B1 | 7/2002 | Gruenwald |
| 6,553,371 B2 | 4/2003 | Gutierrez-Rivas et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 | 4/2007 | Cooper |
| 7,337,174 B1 | 2/2008 | Craig |
| 7,441,264 B2 | 10/2008 | Himmel et al. |
| 7,477,165 B2 | 1/2009 | Fux |
| 7,493,253 B1 | 2/2009 | Ceusters et al. |
| 7,503,007 B2 | 3/2009 | Goodman et al. |
| 7,523,118 B2 | 4/2009 | Friedlander et al. |
| 7,523,123 B2 | 4/2009 | Yang et al. |
| 7,571,163 B2 | 8/2009 | Trask |
| 7,679,534 B2 | 3/2010 | Kay et al. |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,797,319 B2 | 7/2010 | Piedmonte |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2* | 4/2011 | Elbaz ................ G06F 17/30616 706/55 |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,373 B1 | 8/2011 | Zoppas et al. |
| 7,996,393 B1 | 8/2011 | Nanno et al. |
| 8,032,508 B2* | 10/2011 | Martinez ........... G06F 17/30867 707/602 |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,489,641 B1 | 7/2013 | Seefeld et al. |
| 8,620,958 B1 | 12/2013 | Adams et al. |
| 8,799,323 B2 | 8/2014 | Nevin, III |
| 8,849,907 B1 | 9/2014 | Hession et al. |
| 8,914,413 B2 | 12/2014 | Adams et al. |
| 8,983,981 B2 | 3/2015 | Adams et al. |
| 2001/0051881 A1 | 12/2001 | Filler |
| 2002/0091677 A1 | 7/2002 | Sridhar |
| 2002/0111792 A1* | 8/2002 | Cherny ................ G06F 17/277 704/8 |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0097589 A1 | 5/2003 | Syvanne |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2004/0036716 A1 | 2/2004 | Jordahl |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1* | 3/2005 | Gudbjartsson .... G06F 17/30595 |
| 2005/0086243 A1 | 4/2005 | Abbott et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1 | 12/2005 | Card et al. |
| 2005/0283679 A1 | 12/2005 | Heller et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 7/2007 | Sharma et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |

(56) References Cited

U.S. PATENT DOCUMENTS

| | | |
|---|---|---|
| 2008/0091503 A1 | 4/2008 | Schirmer et al. |
| 2008/0133474 A1 | 6/2008 | Hsiao et al. |
| 2008/0147780 A1 | 6/2008 | Trevor et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0182707 A1 | 7/2009 | Kinyon et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0024036 A1 | 1/2010 | Morozov et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0125604 A1 | 5/2010 | Martinez et al. |
| 2010/0125605 A1 | 5/2010 | Nair et al. |
| 2010/0131293 A1 | 5/2010 | Linthicum et al. |
| 2010/0131379 A1 | 5/2010 | Dorais et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0078143 A1 | 3/2011 | Aggarwal |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0161073 A1 | 6/2011 | Lesher et al. |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1* | 10/2011 | Garg ............... G06F 17/30705 707/750 |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1* | 6/2012 | Sweeney ........... G06F 17/30914 706/14 |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330880 A1 | 12/2012 | Arasu et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0173585 A1 | 7/2013 | Friedlander et al. |
| 2013/0191392 A1* | 7/2013 | Kumar ............... G06F 17/30713 707/737 |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291051 A1 | 10/2013 | Balinsky et al. |
| 2013/0291098 A1 | 10/2013 | Chung et al. |
| 2013/0331473 A1 | 11/2013 | Safovich et al. |
| 2013/0326412 A1* | 12/2013 | Treiser ............... G06F 3/0482 715/810 |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1* | 3/2014 | Medelyan ......... G06F 17/30731 707/777 |
| 2014/0074892 A1 | 3/2014 | Adams et al. |
| 2014/0081939 A1 | 3/2014 | Adams et al. |
| 2014/0172417 A1 | 6/2014 | Monk et al. |
| 2014/0184500 A1 | 7/2014 | Adams et al. |
| 2014/0188960 A1 | 7/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| CN | 102236701 | 11/2011 |
| CN | 102385483 A | 3/2012 |
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

U.S. Appl. No. 13/648,801 Examiner's Answer dated Oct. 1, 2015.
U.S. Appl. No. 13/610,523—Non-Final Office Action dated Apr. 30, 2015.
U.S. Appl. No. 13/540,267—Non-Final Office Action dated Jun. 4, 2015.
U.S. Appl. No. 13/609,710—Examiner's Answer dated Jun. 9, 2015.
U.S. Appl. No. 13/780,779—Non-Final Office Action dated Apr. 3, 2015.
U.S. Appl. No. 13/896,461—Non-Final Office Action dated Apr. 21, 2015.
U.S. Appl. No. 13/569,366—Non-Final Office Action dated Jun. 30, 2015.
Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(56) References Cited

OTHER PUBLICATIONS

Evaggelio Pitoura et al., "Context in Databases", University of Ioannina, Greece, 2004, pp. 1-19.
Avinash Kaushik, "End of Dumb Tables in Web Analytics Tools! Hello: Weighted Sort", Sep. 7, 2010, www.kaushik.net, pp. 1-15.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.
Visual Paradigm, "DB Visual Architect 4.0 Designer's Guide: Chapter 6—Mapping Object Model to Data Model and Vice Versa", 2007, pp. 6-2-6-26.
U.S. Appl. No. 13/609,710—Non-Final Office Action dated Jan. 27, 2014.
U.S. Appl. No. 13/540,295—Non-Final Office Action dated Jan. 30, 2014.
U.S. Appl. No. 13/540,230—Non-Final Office Action dated Jan. 30, 2014.
U.S. Appl. No. 13/540,267—Non-Final Office Action dated Feb. 4, 2014.
U.S. Appl. No. 13/628,853—Notice of Allowance dated Mar. 4, 2014.
U.S. Appl. No. 13/595,356—Non-Final Office Action dated Apr. 14, 2014.
"Ninth New Collegiate Dictionary", Merriam-Webster Inc., 1991, p. 77 and 242.
"The American Heritage College Dictionary", Fourth Edition, Houghton Mifflin Company, 2004, pp. 44 and 262.
U.S. Appl. No. 13/680,832—Non-Final Office Action dated Apr. 8, 2014.
U.S. Appl. No. 13/592,905—Notice of Allowance dated Oct. 25, 2013.
U.S. Appl. No. 13/342,406—Non-Final Office Action dated Sep. 27, 2013.
U.S. Appl. No. 13/610,347—Non-Final Office Action dated Jul. 19, 2013.
U.S. Appl. No. 13/610,347—Notice of Allowance dated Aug. 19, 2013.
M.J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.
P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.
A. Birrell et al., "A design for high-performance flash disks." ACM SIGOPS Operating Systems Review 41.2 (2007), pp. 88-93.
Richard Saling, "How to Give a Great Presentation! From the HP Learning Center", Jul. 28, 2008, <http://rsaling.wordpress.com/2008/07/28/how-to-give-a-great-presentation/>, pp. 1-28.
K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.
W. Caid et al., "Context Vector-Based Text Retrieval", Fair Isaac Corporation, Aug. 2003, pp. 1-20.
Anonymous "Fraud Detection Using Data Analytics in the Banking Industry," ACL Services Ltd., 2010, pp. 1-9 <http://www.acl.com/pdfs/DP_Fraud_detection_BANKING.pdf>.
J. Cheng et al., "Context-Aware Object Connection Discovery in Large Graphs", Data Engineering, 2009. ICDE '09. IEEE 25th International Conferen.
R. Angles et al., "Survey of Graph Database Models", ACM Computing Surveys, vol. 40, No. 1, Article 1, Feb. 2008, pp. 1-65.
U.S. Appl. No. 13/592,905—Non-Final Office Action dated May 8, 2013.
U.S. Appl. No. 13/628,853—Non-Final Office Action dated Nov. 7, 2013.
U.S. Appl. No. 13/342,406—Notice of Allowance dated March 20, 2014.
U.S. Appl. No. 13/755,623—Notice of Allowance dated May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action dated Jul. 1, 2014.
U.S. Appl. No. 13/609,710—Final Office Action dated Jul. 24, 2014.
U.S. Appl. No. 13/861,058—Non-Final Office Action dated Dec. 11, 2014.
U.S. Appl. No. 13/733,052—Non-Final Office Action dated Sep. 18, 2014.
U.S. Appl. No. 13/755,987—Non-Final Office Action dated Jan. 2, 2015.
U.S. Appl. No. 13/648,801—Final Office Action dated Jan. 13, 2015.
U.S. Appl. No. 13/609,710 Decision on Appeal Mailed Nov. 4, 2016.
U.S. Appl. No. 13/733,066 Examiner's Answer dated Dec. 20, 2016.
U.S. Appl. No. 13/861,058 Final Office Action dated Dec. 29, 2016.
U.S. Appl. No. 13/648,801 Decision on Appeal Mailed Jan. 18, 2017.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action dated Jan. 28, 2015.
U.S. Appl. No. 13/732,567—Non-Final Office Action dated Jan. 30, 2015.
U.S. Appl. No. 14/078,135—Notice of Allowance dated Feb. 24, 2015.
U.S. Appl. No. 13/756,051—Notice of Allowance dated Feb. 27, 2015.
U.S. Appl. No. 13/732,567—Non-Final Office Action dated Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
S. Ceri et al., "Model-Driven Development of Context-Aware Web Applications", ACM, ACM Transactions on Internet Technology, 2007, (Abstract Only).
Graham Pryor, "Attitudes and Aspirations in a Diverse World: The Project Store Perspective on Scientific Repositories". Ukoln, University of Bath, Digital Curation Center. The International Journal of Digital Curation, Issue 1, vol. 2, 2007. Nov. 2006.
Filippova, Katja and Keith B. Hall, "Improved Video Categorization From Text Metadata and User Comments". Proceedings of the 34th International SCM SIGIR Conference on Research and Development in Information Retrieval. ACM, 2011.
U.S. Appl. No. 13/896,506 Non-Final Office Action dated Oct. 26, 2015.
U.S. Appl. No. 13/342,305, filed Jan. 3, 2012.
U.S. Appl. No. 13/562,714, filed Jul. 31, 2012.
U.S. Appl. No. 15/223,296 Notice of Allowance dated Jun. 30, 2017.

(56) References Cited

OTHER PUBLICATIONS

U.S. Appl. No. 13/861,058 Non-Final Office Action dated Aug. 28, 2017.

* cited by examiner

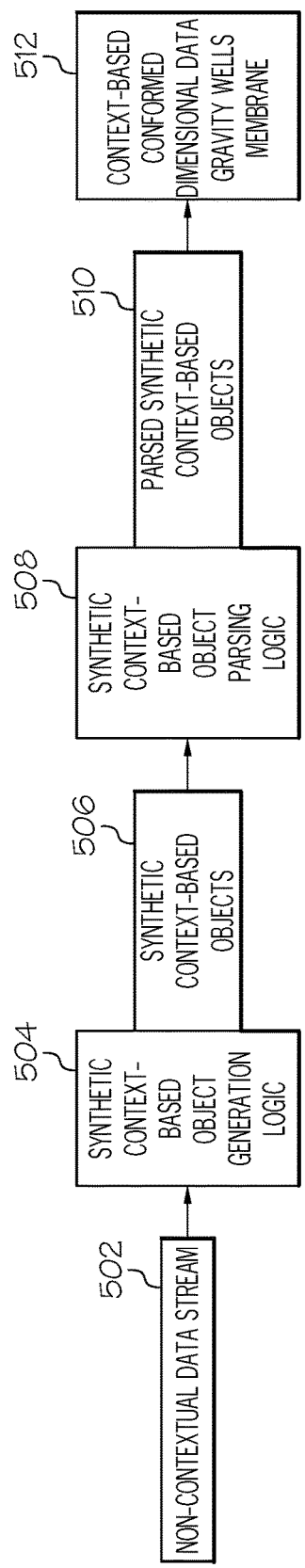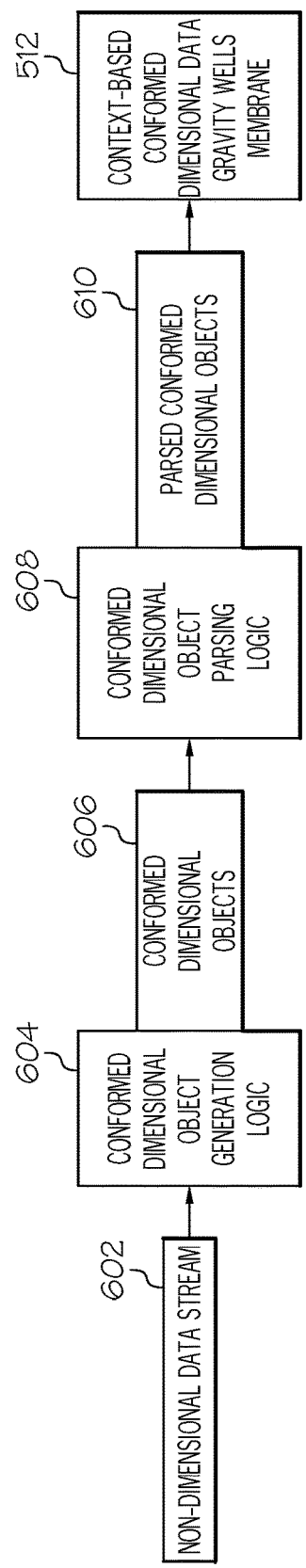

MEASURING AND DISPLAYING FACETS IN CONTEXT-BASED CONFORMED DIMENSIONAL DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A processor-implemented method, system, and/or computer program product measures and displays facets in context-based conformed dimensional data gravity wells. One or more processors receive a data stream of non-contextual data objects, where each of the non-contextual data objects ambiguously relates to multiple subject-matters. One or more processors associate one of the non-contextual data objects with a context object to define a synthetic context-based object, where the context object is a first facet that provides a context that identifies a specific subject-matter, from the multiple subject-matters, of the one of the non-contextual data objects. One or more processors parse the synthetic context-based object into a context-based n-tuple, where the context-based n-tuple includes a pointer to the one of the non-contextual data objects, a probability that a non-contextual data object has been associated with a correct context object, and a weighting factor of importance of the synthetic context-based object. One or more processors create multiple context-based conformed dimensional data gravity well frameworks on a context-based conformed dimensional data gravity wells membrane, where each of the multiple context-based conformed dimensional data gravity well frameworks includes at least one non-contextual data object and at least one context object, and where the context-based conformed dimensional data gravity wells membrane is a virtual mathematical membrane that is capable of supporting multiple context-based conformed dimensional data gravity wells. One or more processors calculate a virtual mass of a parsed synthetic context-based object, where the virtual mass of the parsed synthetic context-based object is derived from a formula of $Pc(C) \times Wtc(S)$, where $Pc(C)$ is a probability that the non-contextual data object has been associated with a correct context object, and where $Wtc(S)$ is the weighting factor of importance of the synthetic context-based object. One or more processors transmit multiple parsed synthetic context-based objects to the context-based conformed dimensional data gravity wells membrane. One or more processors populate each of the multiple context-based conformed dimensional data gravity well frameworks with the multiple parsed synthetic context-based objects to define multiple context-based conformed dimensional data gravity wells according to the virtual mass of multiple parsed synthetic context-based objects that are pulled into each of the context-based conformed dimensional data gravity well frameworks, where each of the multiple parsed synthetic context-based objects is pulled into a particular context-based conformed dimensional data gravity well in response to values from its n-tuple matching said at least one context object in said particular context-based conformed dimensional data gravity well. One or more processors store the particular context-based conformed dimensional data gravity well for use with future retrieval of each of the multiple parsed synthetic context-based objects.

BRIEF DESCRIPTION OF THE DRAWINGS

FIGS. 5-6 depict a process of preparing a data stream for transmission to a context-based conformed dimensional data gravity wells membrane;

DETAILED DESCRIPTION

Figure 1:
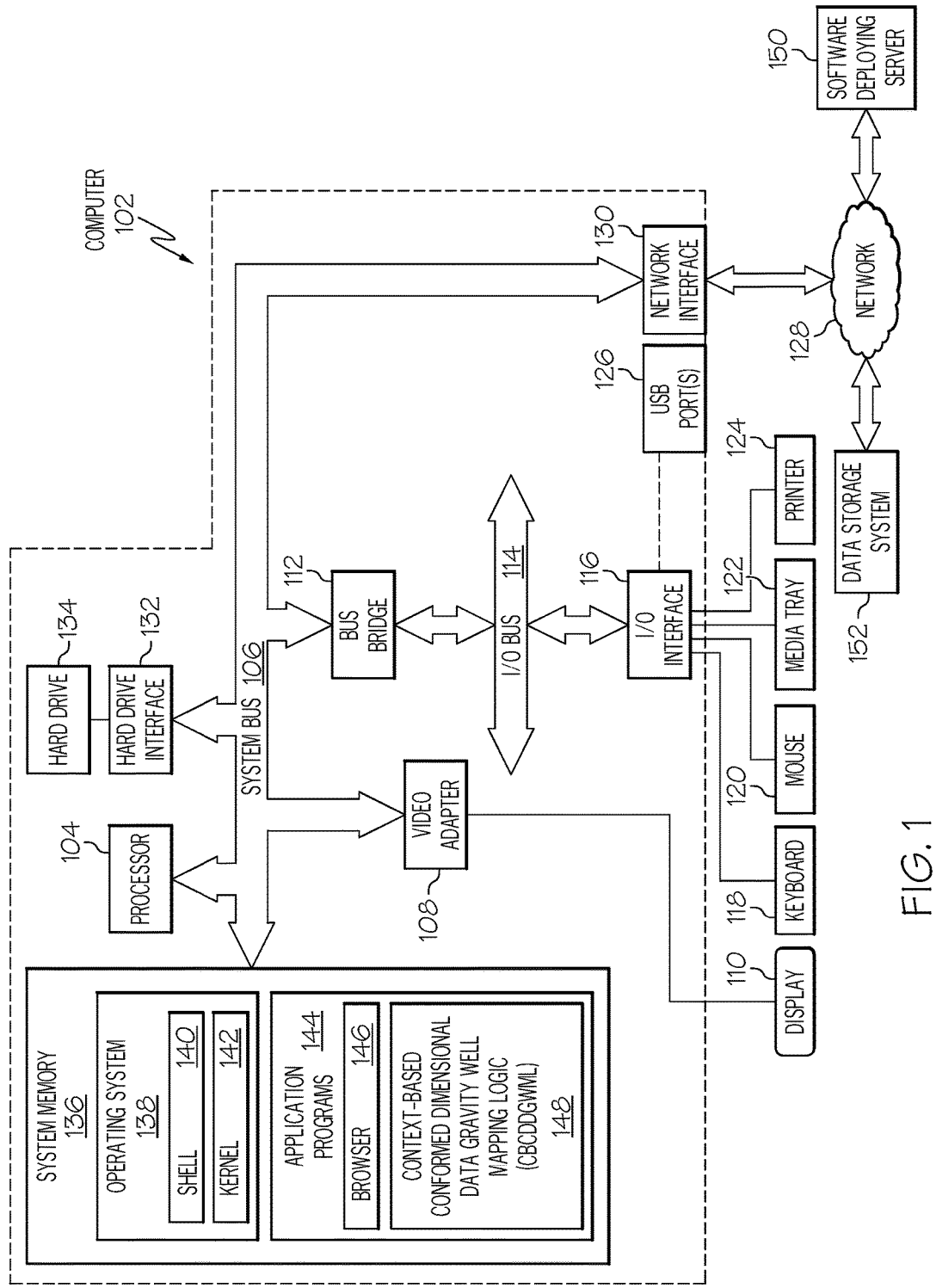
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one embodiment, instructions are stored on a computer readable storage device (e.g., a CD-ROM), which does not include propagation media.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing.

Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a context-based conformed dimensional data gravity well mapping logic (CBCDDGWML) 148. CBCDDGWML 148 includes code for implementing the processes described below, including those described in FIGS. 2-13, and/or for creating the data gravity wells, membranes, etc. that are depicted in FIGS. 5-7 and 9-13. In one embodiment, computer 102 is able to download CBCDDGWML 148 from software deploying server 150, including in an on-demand basis, wherein the code in CBCDDGWML 148 is not downloaded until needed for execution. Note further that, in one embodiment of the present invention, software deploying server 150 performs all of the functions associated with the present invention (including execution of CBCDDGWML 148), thus freeing computer 102 from having to use its own internal computing resources to execute CBCDDGWML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
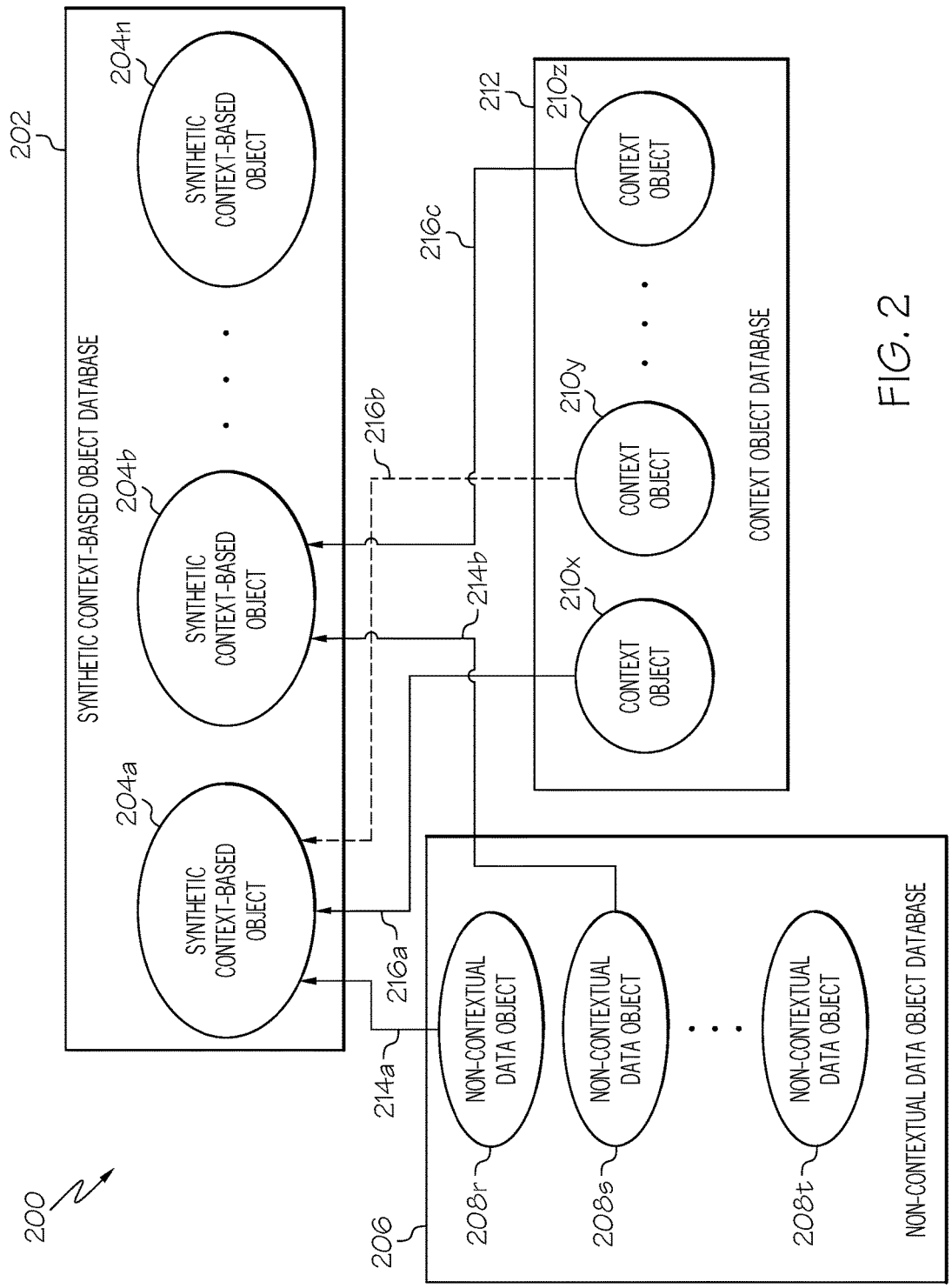
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
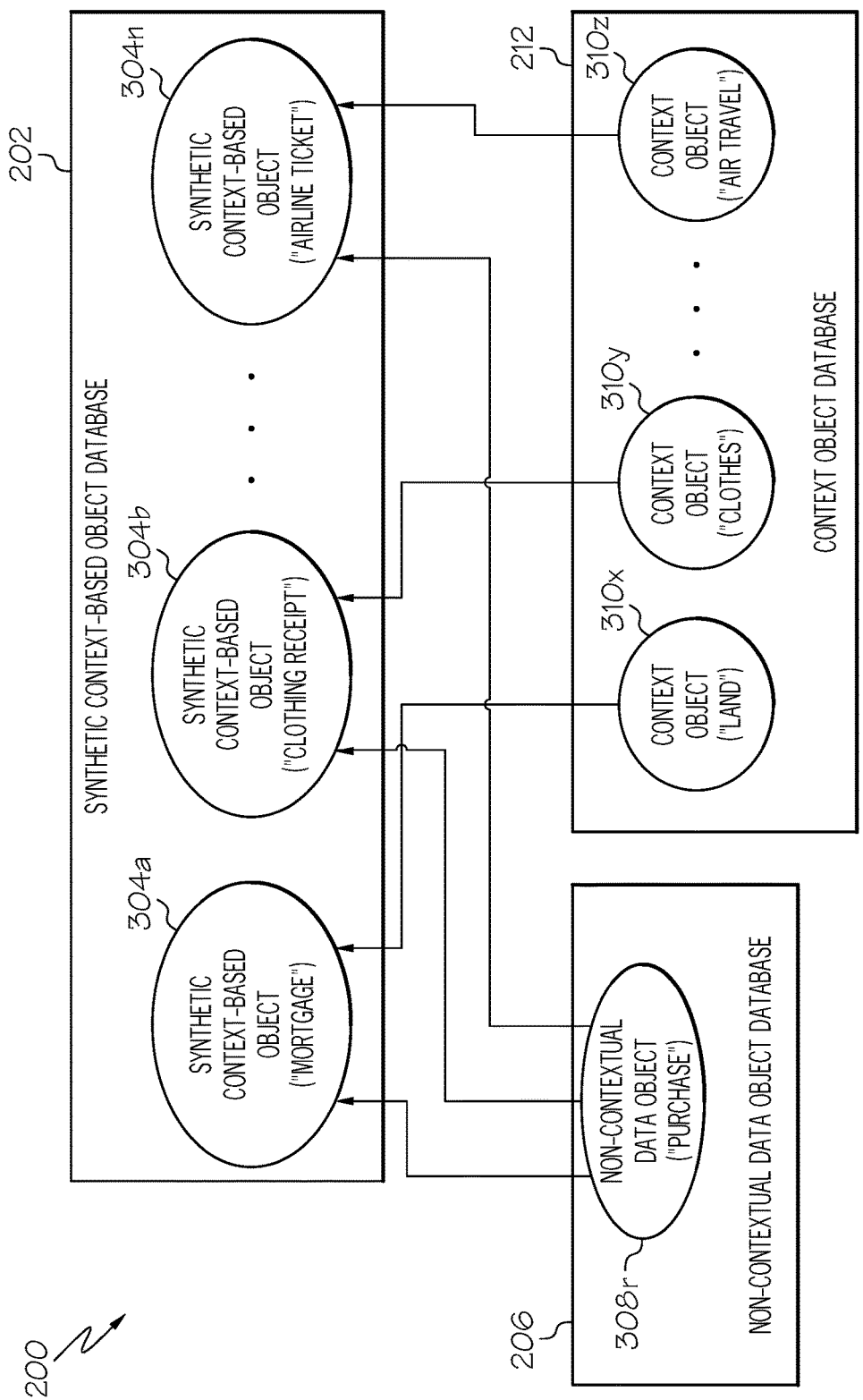
FIG. 3 depicts an exemplary case in which synthetic context-based objects are defined for the non-contextual data object datum "purchase"

Consider now an exemplary case depicted in FIG. 3, in which synthetic context-based objects are defined for the non-contextual datum object "purchase". Standing alone, without any context, the word "purchase" is meaningless, since it is ambiguous and does not provide a reference to any particular subject-matter. That is, "purchase" may refer to a financial transaction, or it may refer to moving an item using mechanical means. Furthermore, within the context of a financial transaction, "purchase" has specific meanings. That is, if the purchase is for real property (e.g., "land"), then a mortgage company may use the term to describe a deed of trust associated with a mortgage, while a title company may use the term to describe an ownership transfer to the purchaser. Thus, each of these references is within the context of a different subject-matter (e.g., mortgages, ownership transfer, etc.).

In the example shown in FIG. 3, then, data (i.e., the word "purchase") from the non-contextual data object 308$r$ is associated with (e.g., stored in or associated by a look-up table, etc.) a synthetic context-based object 304$a$, which is devoted to the subject-matter "mortgage". The data/word "purchase" from non-contextual data object 308$r$ is also associated with a synthetic context-based object 304$b$, which is devoted to the subject-matter "clothing receipt". Similarly, the data/word "purchase" from non-contextual data object 308$r$ is also associated with a synthetic context-based object 304$n$, which is devoted to the subject-matter "airline ticket".

In order to give contextual meaning to the word "purchase" (i.e., define the term "purchase") in the context of "land", context object 310$x$, which contains the context datum "land", is associated with (e.g., stored in or associated by a look-up table, etc.) the synthetic context-based object 304$a$. Associated with the synthetic context-based object 304$b$ is a context object 310$y$, which provides the context/datum of "clothes" to the term "purchase" provided by the non-contextual data object 308$r$. Thus, the synthetic context-based object 304$b$ defines "purchase" as that which is related to the subject-matter "clothing receipt", including electronic, e-mail, and paper evidence of a clothing sale. Associated with the synthetic context-based object 304$n$ is a context object 310$z$, which provides the context/datum of "air travel" to the term "purchase" provided by the non-contextual data object 308$r$. Thus, the synthetic context-based object 304$n$ defines "purchase" as that which is related to the subject-matter "airline ticket", including electronic, e-mail, and paper evidence of a person's right to board a particular airline flight.

In one embodiment, the data within a non-contextual data object is even more meaningless if it is merely a combination of numbers and/or letters. For example, consider the scenario in which data "10" were to be contained within a non-contextual data object 308$r$ depicted in FIG. 3. Standing alone, without any context, this number is meaningless, identifying no particular subject-matter, and thus is completely ambiguous. That is, "10" may relate to many subject-matters. However, when associated with context objects that define certain types of businesses, then "10" is inferred (using associative logic such as that found in CBCDDG-WML 148 shown in FIG. 1) to relate to acreage when associated with context object 310$x$, to a clothing size when associated with context object 310$y$, and to thousands of air miles (credits given by an airline to be used in future ticket purchases) when associated with context object 310$z$. That is, the data "10" is so vague/meaningless without the associated context object that the data does not even identify the units that the term describes, much less the context of these units.

Figure 4:
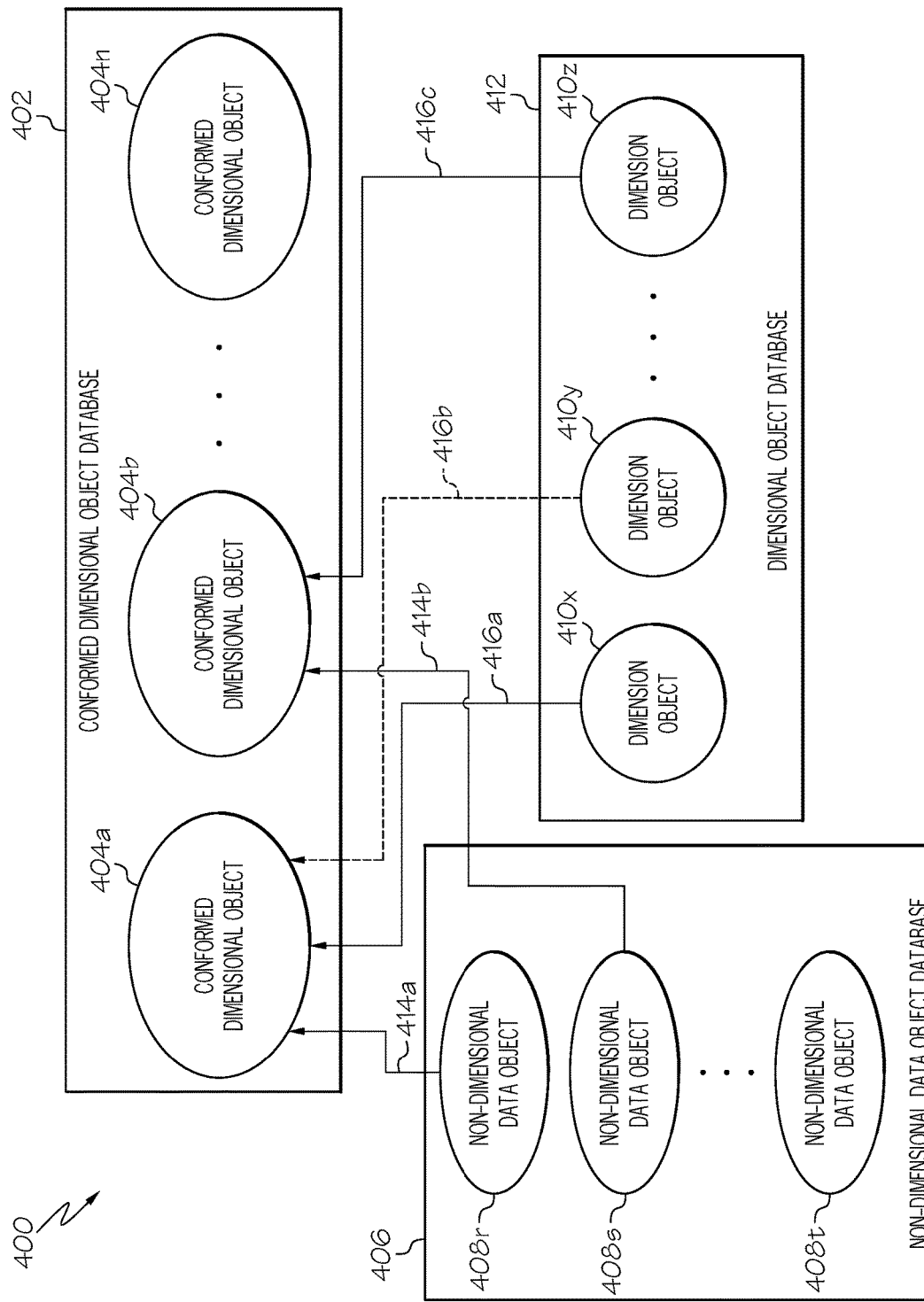
FIG. 4 illustrates a process for generating one or more conformed dimensional objects.

With reference now to FIG. 4, a process for generating one or more conformed dimensional objects in a system 400 is presented. Note that system 400 is a processing and storage logic found in computer 102 and/or data storage system 152 shown in FIG. 1, which process, support, and/or contain the databases, pointers, and objects depicted in FIG. 4.

Within system 400 is a conformed dimensional object database 402, which contains multiple conformed dimensional objects 404$a$-404$n$ (thus indicating an "n" quantity of objects, where "n" is an integer). Each of the conformed dimensional objects 404$a$-404$n$ is defined by at least one non-dimensional data object and at least one dimension object. That is, at least one non-dimensional data object is associated with at least one dimension object to define one or more of the conformed dimensional objects 404$a$-404$n$. The non-dimensional data object is merely a value/number, and has no dimensions (e.g., meters, product units, kilograms, etc.), and the dimension object provides a measurement scale to the non-dimensional data object.

For example, assume that a non-dimensional data object database 406 includes multiple non-dimensional data objects 408$r$-408$t$ (thus indicating a "t" quantity of objects, where "t" is an integer). However, data within each of these non-dimensional data objects 408$r$-408$t$ by itself is meaningless, since it has no dimensions. That is, the data within each of the non-dimensional data objects 408$r$-408$t$ is data that, standing alone, has no meaning, since it could be describing a number of inches, a number of feet, a number of meters, etc. (i.e., it is dimensional-less). In order to give the data within each of the non-dimensional data objects 408$r$-408$t$ dimensional meaning, they are given dimension, which is provided by data contained within one or more of the dimension objects 410$x$-410$z$ (thus indicating a "z" quantity of objects, where "z" is an integer) stored within a dimension object database 412. For example, if a pointer 414$a$ points the non-dimensional data object 408$r$ to the conformed dimensional object 404$a$, while a pointer 416$a$ points the dimension object 410$x$ to the conformed dimensional object 404$a$, thus associating the non-dimensional data object 408$r$ and the dimension object 410$x$ with the conformed dimensional object 404$a$ (e.g., storing or otherwise associating the data within the non-dimensional data object 408$r$ and the dimension object 410$x$ in the conformed dimensional object 404$a$), the data within the non-dimensional data object 408$r$ now has been given a label/dimension. This dimensional label/meaning is thus stored within (or otherwise associated with) the conformed dimensional object 404$a$.

Similarly, if a pointer 414$b$ associates data within the non-dimensional data object 408$s$ with the conformed dimensional object 404$b$, while the pointer 416$c$ associates data within the dimension object 410$z$ with the conformed dimensional object 404$b$, then the data within the non-dimensional data object 408$s$ is now given a dimension/label by the data in the dimension object 410$z$. This dimensional meaning is thus stored within (or otherwise associated with) the conformed dimensional object 404$b$.

Note that more than one dimension object can give meaning to a particular non-dimensional data object. For example, both dimension object 410$x$ and dimension object 410$y$ can point to the conformed dimensional object 404$a$, thus providing compound dimensional meaning to the non-dimensional data object 408$r$ shown in FIG. 4. This compound dimensional meaning provides various layers of dimension (e.g., weight and source; store location and price; etc.) to the data in the non-dimensional data object 408$r$.

Note also that while the pointers 414$a$-414$b$ and 416$a$-416$c$ are logically shown pointing toward one or more of the conformed dimensional objects 404$a$-404$n$, in one embodiment the conformed dimensional objects 404a-404n actually point to the non-dimensional data objects 408r-408t and the dimension objects 410x-410z. That is, in one embodiment the conformed dimensional objects 404a-404n locate the non-dimensional data objects 408r-408t and the dimension objects 410x-410z through the use of the pointers 414a-414b and 416a-416c.

With reference now to FIG. 5, a process of preparing a non-contextual data stream for transmission to a context-based conformed dimensional data gravity wells membrane is presented. A non-contextual data stream 502 is initially received. For example, assume that an enterprise is tracking sales at a particular store. In this example, the non-contextual data stream 502 may be real-time data that describes what products are being sold, their price, their profit margin, the store location, etc. In one embodiment, however, the non-contextual data stream 502 only includes "raw" data, which has no contextual meaning. In order to give this raw data contextual meaning, the raw data (i.e., non-contextual data objects) are associated with one or more context objects, as described above in FIG. 2—FIG. 3, through the use of a synthetic context-based object generation logic 504 (i.e., part of CBCDDGWL 148 depicted in FIG. 1). Synthetic context-based object generation logic 504 thus converts the non-contextual data stream 502 into synthetic context-based objects 506 (e.g., the synthetic context-based objects 204a-n located in synthetic context-based object database 202 in FIG. 2).

In order to properly utilize the synthetic context-based objects 506, a synthetic context-based object parsing logic 508 parses the synthetic context-based objects 506 into parsed synthetic context-based objects 510. These parsed synthetic context-based objects 510 make up an n-tuple (i.e., an ordered list of "n" descriptive elements (where "n" is an integer)) that describe each of the synthetic context-based objects 506. In one embodiment, this n-tuple includes a pointer (e.g., a locating pathway) to the non-contextual data object in the synthetic context-based object. This pointer may be to a storage location (e.g., a universal resource locator (URL) address at which the non-contextual data object is stored), such that the synthetic context-based objects 506 must be generated, or the pointer may be local (such that the synthetic context-based objects 506 exist locally as part of a streaming data packet, etc.). In one embodiment, the n-tuple also includes a probability value that a non-contextual data object has been associated with a correct context object. That is, a correct context object may or may not be associated with a particular non-contextual data object. For example, the non-contextual data object may be incomplete (i.e., a fragment, a corrupted version, etc.) version of the actual non-contextual data.

As such, a "guess" must be made to determine which context data should be associated with that corrupted non-contextual data. In this example, assume that the corrupted non-contextual data object contains the value "3.13", and that the data is related to areas of circles. If the value of the non-contextual data object had been "3.14159", then there is a high probability (e.g., is predetermined to have a 99% probability) that the context of this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the synthetic context-based object. In one embodiment, this weighting factor is how "important" this particular synthetic context-based object is to an enterprise's project. For example, assume that an enterprise project is to track sales of a particular product at a particular store. If the synthetic context-based object contains information regarding an average sale price of units of a particular product sold at this particular store during a particular time period, then this synthetic context-based object is given (either manually or by an algorithm) an "importance" rating of 95 out of 100. However, if the synthetic context-based object describes whether the items are "red" or "blue" in color, such information is deemed less important (e.g., is given an "importance" rating of 30 out of 100). Note that an algorithm to determine (and/or predetermine) these importance ratings can utilize flags, metadata, etc. to determine the importance of the synthetic context-based objects. For example, assume that a particular synthetic context-based object has a flag indicating that it describes an average price for products sold at a particular store on a particular day. Assume further that a software program for an enterprise project to track such products also has this flag. Thus, if the two flags match, then a high level of importance (e.g., over 95 on a scale of 100) is assigned to synthetic context-based objects that have this flag.

The parsed synthetic context-based objects 510 are then sent to a context-based conformed dimensional data gravity wells membrane 512. The context-based conformed dimensional data gravity wells membrane 512 is a virtual mathematical membrane that is capable of supporting multiple context-based conformed dimensional data gravity wells. That is, the context-based conformed dimensional data gravity wells membrane 512 is a mathematical framework that is part of a program such as CBCDDGWL 148 shown in FIG. 1. This mathematical framework is able to 1) provide a virtual environment in which the multiple context-based data gravity wells exist; 2) populate the multiple context-based conformed dimensional data gravity wells with appropriate synthetic context-based objects (e.g., those synthetic context-based objects having non-contextual data objects and context objects that match those found in the structure of a particular context-based conformed dimensional data gravity well); and 3) support the visualization/display of the context-based conformed dimensional data gravity wells on a display.

With reference now to FIG. 6, a process of preparing a non-dimensional data stream for transmission to a context-based conformed dimensional data gravity wells membrane is presented. A non-dimensional data stream 602 is initially received. For example, assume again that an enterprise is tracking sales at a particular store. As with the non-contextual data stream 502 described above, the non-dimensional data stream 602 is real-time data that describes what products are being sold, their price, their profit margin, the store location, etc. In this feature, however, the non-dimensional data stream 602 includes "raw" data that has no dimensional meaning. In order to give this raw data dimensional meaning, the raw data (i.e., non-dimensional data objects) are associated with one or more dimension objects, as described above in FIG. 4, through the use of a conformed dimensional object generation logic 604 (i.e., part of CBCDDGWL 148 depicted in FIG. 1). Conformed dimensional object generation logic 604 thus converts the non-dimensional data stream 602 into conformed dimensional objects 606 (e.g., the conformed dimensional objects 404a-404n located in conformed dimensional object database 402 in FIG. 4).

In order to properly utilize the conformed dimensional objects 606, a conformed dimensional object parsing logic 608 parses the conformed dimensional objects 606 into parsed conformed dimensional objects 610. These parsed conformed dimensional objects 610 make up an n-tuple (i.e., an ordered list of "n" descriptive elements (where "n" is an integer)) that describe each of the conformed dimensional objects 606. In one embodiment, this n-tuple includes a pointer (e.g., a locating pathway) to the non-dimensional data object in the conformed dimensional object. This pointer may be to a storage location (e.g., a universal resource locator (URL) address at which the non-dimensional data object is stored), such that the conformed dimensional objects 606 must be generated, or the pointer may be local (such that the conformed dimensional objects 606 exist locally as part of a streaming data packet, etc.). In one embodiment, the n-tuple also includes a probability value that a non-dimensional data object has been associated with a correct dimension object. That is, a correct dimension object may or may not be associated with a particular non-dimensional data object. For example, the non-dimensional data object may be incomplete (i.e., a fragment, a corrupted version, etc.) version of the actual non-dimensional data. As such, a "guess" must be made to determine which dimension data should be associated with that corrupted non-dimensional data. In this example, assume that the corrupted non-dimensional data object contains the value "3.13", and that the data is related to areas of circles. If the value of the non-dimensional data object had been "3.14159", then there is a high probability (e.g., is predetermined to have a 99% probability) that this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the conformed dimensional object. In one embodiment, this weighting factor is how "important" this particular conformed dimensional object is to an enterprise's project. For example, assume that an enterprise project is to track sales of a particular product at a particular store. If the conformed dimensional object contains information regarding how many units of this particular product have been sold at this store during a particular time period, then this conformed dimensional object is given (either manually or by an algorithm) an "importance" rating of 95 out of 100. However, if the conformed dimensional object describes whether the items are being paid for with cash or credit cards, such information is deemed less important (e.g., is given an "importance" rating of 30 out of 100). Note that an algorithm to determine (and/or predetermine) these importance ratings can utilize flags, metadata, etc. to determine the importance of the conformed dimensional objects. For example, assume that a particular conformed dimensional object has a flag indicating that it describes a quantity of products sold at a particular store on a particular day. Assume further that a software program for an enterprise project to track such products also has this flag. Thus, if the two flags match, then a high level of importance (e.g., over 95 on a scale of 100) is assigned to conformed dimensional objects that have this flag.

The parsed conformed dimensional objects 610 are then sent to the context-based conformed dimensional data gravity wells membrane 512, which is described above as depicted in FIG. 5.

Figure 7:
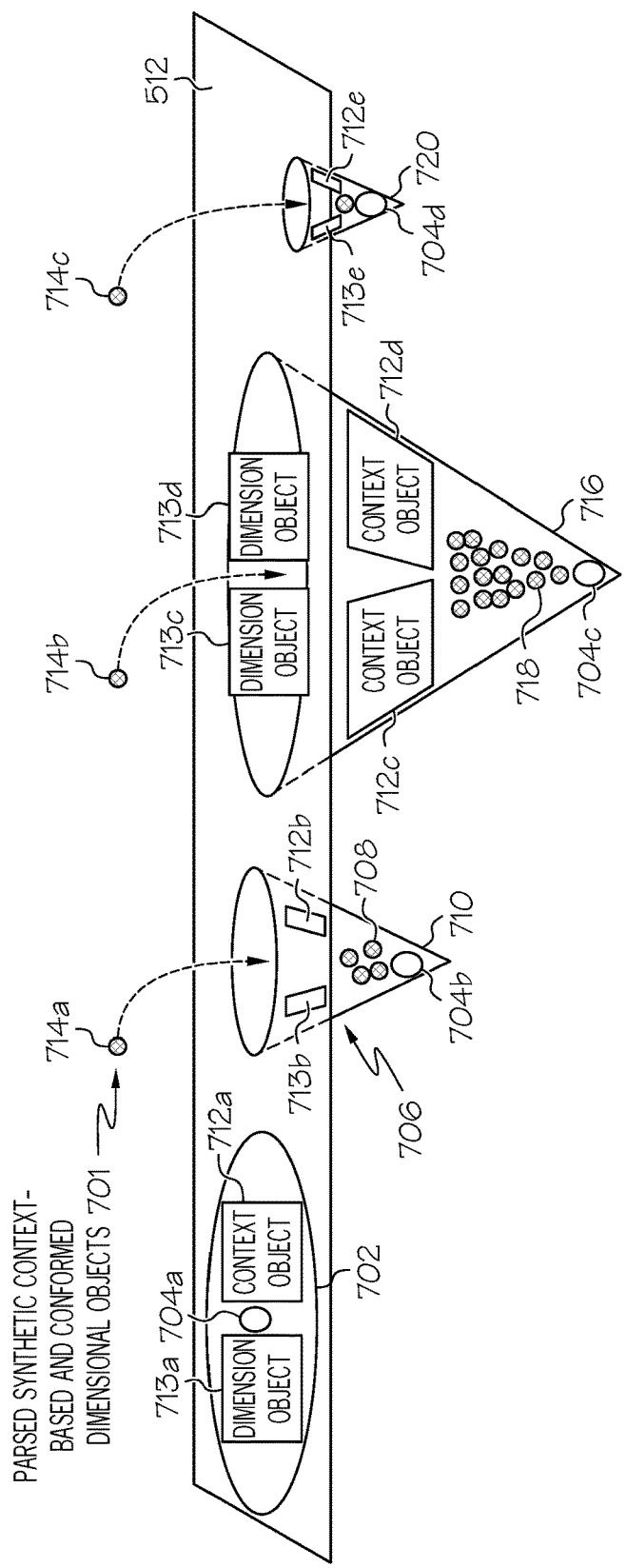
FIG. 7 illustrates parsed synthetic context-based and parsed conformed dimensional objects being selectively pulled into context-based conformed dimensional data gravity well frameworks in order to define context-based conformed dimensional data gravity wells.

FIG. 7 depicts a combination of parsed synthetic context-based and conformed dimensional objects (i.e., parsed objects 701) being selectively pulled into context-based conformed dimensional data gravity well frameworks in order to define context-based conformed dimensional data gravity wells. As described herein, these context-based conformed dimensional data gravity wells are capable of pulling in either synthetic context-based objects or conformed dimensional objects, which are defined and described above. Context-based conformed dimensional data gravity wells membrane 512 (depicted above in FIG. 5) supports multiple context-based conformed dimensional data gravity well frameworks. For example, consider context-based conformed dimensional data gravity well framework 702. A context-based conformed dimensional data gravity well framework is defined as a construct that includes the capability of pulling data objects from a streaming data flow, such as parsed objects 701, and storing same if a particular parsed object from parsed objects 701 contains a particular dimension object 713a and/or a particular context object 712a and/or a particular non-contextual data object 704a. Note that parsed objects 701 include both synthetic context-based objects as well as conformed dimensional objects, both of which are described/defined above.

Note that context-based conformed dimensional data gravity well framework 702 is not yet populated with any parsed objects, and thus is not yet a context-based conformed dimensional data gravity well. However, context-based conformed dimensional data gravity well framework 706 is populated with parsed objects 708, which are synthetic context-based objects and/or conformed dimensional objects, and thus has been transformed into a context-based conformed dimensional data gravity well 710. This transformation occurred when context-based conformed dimensional data gravity well framework 706, which contains (i.e., logically includes and/or points to) a non-contextual data object 704b, a context object 712b, and a dimension object 713b, one or more of which is part of each of the captured parsed objects 708 was populated with one or more parsed objects. As stated above, each of the captured parsed objects 708 may be either a synthetic context-based object or a conformed dimensional object.

Note that parsed objects 701 are streaming in real-time from a data source across the context-based conformed dimensional data gravity wells membrane 512. If a particular parsed object is never pulled into any of the context-based conformed dimensional data gravity wells on the context-based conformed dimensional data gravity wells membrane 512, then that particular parsed object simply continues to stream to another destination, and does not affect the size and/or location of any of the context-based conformed dimensional data gravity wells.

Consider now context-based conformed dimensional data gravity well 716. Note that context-based conformed dimensional data gravity well 716 includes two dimension objects 713c-713d as well as two context objects 712c-712d and a non-contextual data object 704c. The presence of dimension objects 713c-713d and context objects 712c-712d (which in one embodiment are graphically depicted on the walls of the context-based conformed dimensional data gravity well 716) causes objects such as parsed object 714b (which in one embodiment contains both dimension objects 713c and 713d and/or both context objects 712c-712d and/or non-contextual data object 704*c*) to be pulled into context-based conformed dimensional data gravity well 716. Note further that context-based conformed dimensional data gravity well 716 is depicted as being larger than context-based conformed dimensional data gravity well 710 or context-based conformed dimensional data gravity well 720, since there are more objects (parsed objects 718) in context-based conformed dimensional data gravity well 716 than there are in these other context-based conformed dimensional data gravity wells. That is, it is the quantity of objects that have been pulled into a particular context-based conformed dimensional data gravity well that determines the size and shape of that particular context-based conformed dimensional data gravity well. The fact that context-based conformed dimensional data gravity well 716 has two dimension objects 712*c*-712*d* and two context objects 712*c*-712*d*, while context-based conformed dimensional data gravity wells 710/720 have only one dimension object 713*b*/713*e* and one context object 712*b*/712*e*, has no bearing on the size of the context-based conformed dimensional data gravity wells 710/720. Rather, the size and shape of the context-based conformed dimensional data gravity wells 710/716/720 in this embodiment is based solely on the quantity of parsed objects that are pulled in.

Note that, in one embodiment, the context-based conformed dimensional data gravity wells depicted in FIG. 7 can be viewed as context-based dimensional relationship density wells. That is, the context-based conformed dimensional data gravity wells have a certain density of objects, which is due to a combination of how many objects have been pulled into a particular well as well as the weighting assigned to the objects, as described herein.

In one embodiment, the context-based conformed dimensional data gravity well frameworks and/or context-based conformed dimensional data gravity wells described in FIG. 7 are graphical representations of 1) sorting logic and 2) data storage logic that is part of CBCDDGWL 148 shown in FIG. 1. That is, the context-based conformed dimensional data gravity well frameworks define the criteria that are used to pull a particular parsed object into a particular context-based conformed dimensional data gravity well, while the context-based conformed dimensional data gravity wells depict the quantity of parsed objects that have been pulled into a particular context-based conformed dimensional data gravity well. Note that in one embodiment, the original object from the stream of parsed objects 701 goes into an appropriate context-based conformed dimensional data gravity well, with no copy of the original being made. In another embodiment, a copy of the original object from the stream of parsed objects 701 goes into an appropriate context-based conformed dimensional data gravity well, while the original object continues to its original destination (e.g., a server that keeps a database of inventory of items at a particular store). In another embodiment, the original object from the stream of parsed objects 701 goes into an appropriate context-based conformed dimensional data gravity well, while the copy of the original object continues to its original destination (e.g., a server that keeps a database of inventory of items at a particular store).

Figure 8:
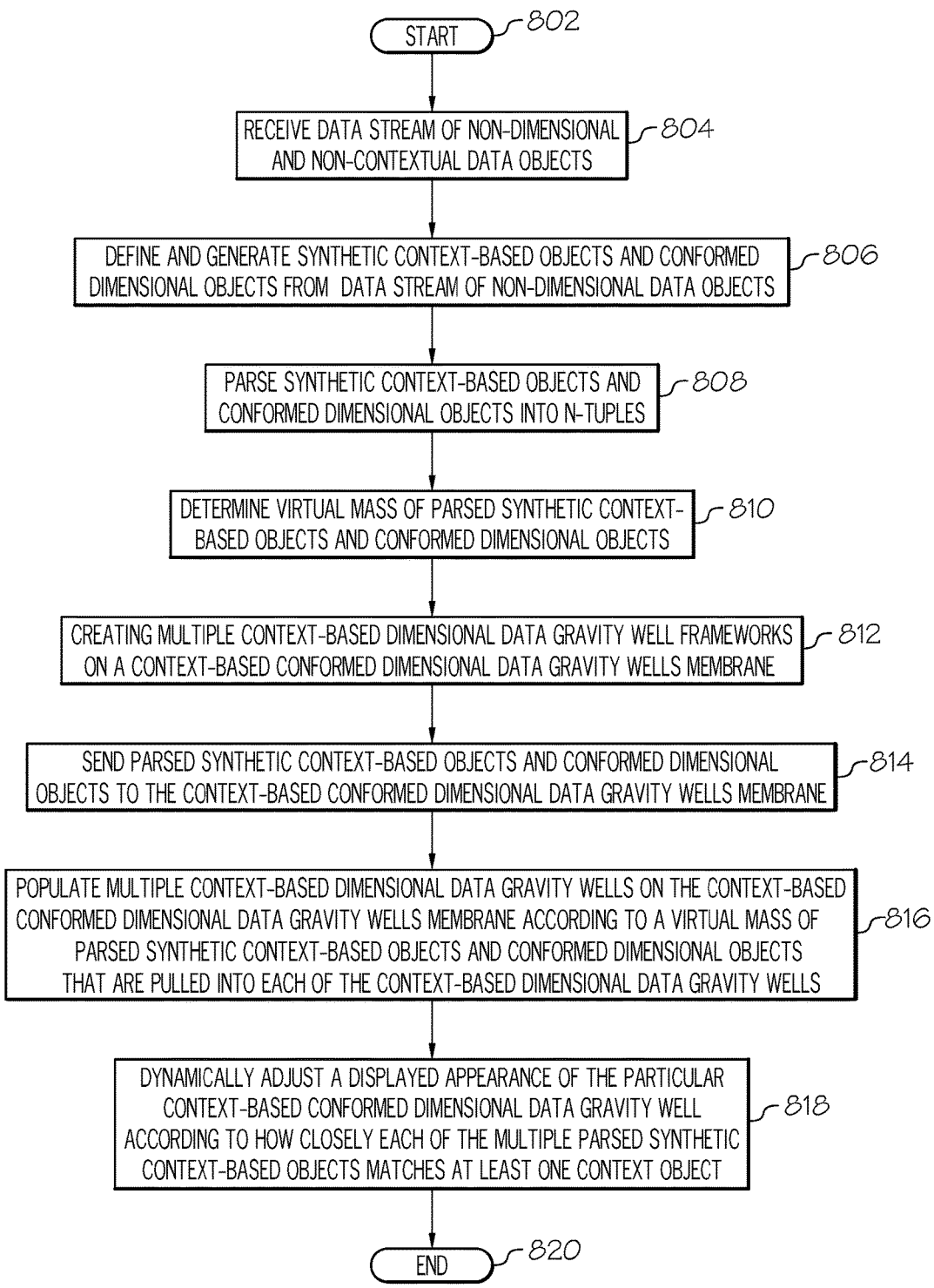
FIG. 8 is a high-level flow chart of one or more steps performed by a processor to define multiple context-based conformed dimensional data gravity wells on a context-based conformed dimensional data gravity wells membrane and to dynamically adjust a displayed appearance of a particular context-based conformed dimensional data gravity well according to how closely each of the multiple parsed synthetic context-based objects matches at least one context object.

With reference now to FIG. 8, a high-level flow chart of one or more steps performed by a processor to define multiple context-based conformed dimensional data gravity wells on a context-based conformed dimensional data gravity wells membrane is presented. After initiator block 802, a data stream (e.g., element 502 in FIG. 5 or element 602 in FIG. 6) of non-dimensional data objects and non-contextual data objects is received by a processor (block 804). As described herein, each of the non-dimensional data objects describes an alphanumeric value that is dimensionless, and thus does not by itself describe a quantity of an item, or in some embodiments, even the item itself. Similarly, each of the non-contextual data objects ambiguously relates to multiple subject-matters. As described in block 806, the processor then applies a dimension object to each of the non-dimensional data objects, in order to define and generate conformed dimensional objects from the data stream of non-dimensional data objects, and the processor associates each of the non-contextual data objects with one or more context objects, in order to define a synthetic context-based object. As described herein (e.g., see FIG. 2 above), the context object provides a context that identifies a specific subject-matter, from the multiple subject-matters, for the non-contextual data objects. As described above in FIG. 4, the dimension object provides a dimension that provides a meaningful dimension to each of the non-dimensional data objects.

As depicted in block 808, the processor parses each of the streaming objects into an n-tuple. For the conformed dimensional objects, each n-tuple comprises a pointer to one of the non-dimensional data objects, a probability that a non-dimensional data object has been associated with a correct dimension object, and a weighting factor of importance of the conformed dimensional object. For the synthetic context-based objects, each n-tuple comprises a pointer to one of the non-contextual data objects, a probability that a non-contextual data object has been associated with a correct context object, and a weighting factor of importance of the synthetic context-based object. In one embodiment, the n-tuple also includes a probability that a particular object is uncorrupted. For example, if it is determined that a particular object is a fragment of an original object (e.g., by comparing the length, format, and other features of that object with known lengths, formats, and other features of data/objects coming from the same data/object source as that particular object), then a probability can be assessed as to whether that particular object is corrupted. For example, if a particular data object from "Source A" is 32 characters long, while a typical (e.g., 90% of the data objects from Source A) data object from Source A is 30 characters long, then it is likely (e.g., 80% probable) that this particular data object has been corrupted with additional data. Similarly, if a particular data object from Source A is 22 characters long, while a typical (e.g., 99% of the data objects from Source A) data object from Source A is 30 characters long, then it is likely (e.g., 99% probable) that this particular data object has been corrupted by having certain bits truncated/removed.

With respect to block 810, the processor calculates a virtual mass of each of the parsed objects. In one embodiment, the virtual mass of the parsed object is derived by calculating the virtual mass of a parsed synthetic context-based object by using the formula $P_c(C) \times Wt_c(S)$, where $P_c(C)$ is the probability that the non-contextual data object has been associated with the correct context object, and where $Wt_c(S)$ is the weighting factor of importance of the synthetic context-based object; and by calculating the virtual mass of a parsed conformed dimensional object by using the formula $P_d(C) \times Wt_d(S)$, where $P_d(C)$ is the probability that 1) said one of the non-dimensional data objects has been associated with the correct dimensional label, 2) said one of the non-dimensional data objects is uncorrupted, and 3) said one of the non-dimensional data objects has come from a data source whose data has been predetermined to be appropriate for storage in a particular context-based conformed dimensional data gravity well; and where $Wt_d(S)$ is the weighting factor of importance of the conformed dimensional object. The probabilities of 1) and 2) occurring are discussed above. The probability of 3) occurring can be predetermined by assigning one or more flags or other markers to each of the context-based conformed dimensional data gravity wells. For example, assume that these flags/markers identify five characteristics (e.g., length of the data, format of the data, time/date of when the data is generated, how frequently identical data is generated, and a source type (e.g., point of sales stations, stored databases, websites, etc.) of the data) of data that will be accepted in a particular context-based conformed dimensional data gravity well. If a certain non-dimensional data object has four of these flags/markers (e.g., as part of its n-tuple), then there may be a 90% probability that this non-dimensional data object is appropriate for storage within the particular context-based conformed dimensional data gravity well that has the five flags/markers. However, if a certain non-dimensional data object has only three of these flags/markers (e.g., as part of its n-tuple), then there may be only a 50% probability that this non-dimensional data object is appropriate for storage within that same particular context-based conformed dimensional data gravity well.

Continuing with the overall formula P(C)×Wt(S), Wt(S) is the weighting factor of importance of the conformed dimensional object. As described herein, in one embodiment the weighting factor of importance of the conformed dimensional object is based on how important the conformed dimensional object is to a particular project.

As described in block 812, the processor creates multiple context-based conformed dimensional data gravity well frameworks on a context-based conformed dimensional data gravity wells membrane. Each of the multiple context-based conformed dimensional data gravity well frameworks comprises at least one dimension object, at least one non-contextual data object, and at least one context object. As described herein, the context-based conformed dimensional data gravity wells membrane is a virtual mathematical membrane that is capable of supporting multiple context-based conformed dimensional data gravity wells.

As described in block 814, multiple parsed objects are then transmitted to the context-based conformed dimensional data gravity wells membrane. That is, these parsed objects are then transmitted to an algorithmic environment in which the logic-enabled context-based conformed dimensional data gravity well frameworks exist. These context-based conformed dimensional data gravity well frameworks are algorithmically generated based on their ability to attract specific objects. As described in block 816, this pulling/attraction enables the processor to define multiple context-based conformed dimensional data gravity wells according to the virtual mass of multiple parsed objects that are pulled into each of the context-based conformed dimensional data gravity well frameworks. As described herein, each of the multiple parsed objects is pulled into a particular context-based conformed dimensional data gravity well in response to values from its n-tuple matching at least one dimensional object, at least one non-contextual data object, at least one context object, and/or other probability factors described herein, that is part of the particular context-based conformed dimensional data gravity well.

In one embodiment, the generated context-based conformed dimensional data gravity wells are presented on a display according to a combined virtual mass of the multiple parsed objects that populate each context-based conformed dimensional data gravity well. That is, a first context-based conformed dimensional data gravity well that holds a more virtually massive combination of parsed objects than a second context-based conformed dimensional data gravity well will be larger, and thus is visually depicted on a display as extending farther away from the context-based conformed dimensional data gravity wells membrane than the second context-based conformed dimensional data gravity well.

In one embodiment, the construction of the context-based conformed dimensional data gravity wells is temporally dynamic. That is, in this embodiment, the processor determines an age (i.e., how "stale" or "old") each of the multiple parsed objects that have been pulled into the particular context-based conformed dimensional data gravity well is. Based on the age of each of these objects, the processor removes, from the particular context-based conformed dimensional data gravity well that holds a stale object, any parsed object that is older than a predetermined age.

In one embodiment, a likelihood that a particular object is pulled into an appropriate context-based conformed dimensional data gravity well is performed using a Bayesian probability formula. That is, an appropriate context-based conformed dimensional data gravity well is defined as a context-based conformed dimensional data gravity well whose framework includes at least one non-contextual data object, at least one context object, and/or at least one dimension object found in a parsed object that is pulled into that particular (appropriate) context-based conformed dimensional data gravity well.

For example, in order to determine a likelihood that a particular object is pulled into an appropriate context-based conformed dimensional data gravity well, assume that A represents the event that a particular object is a good populator of a particular context-based conformed dimensional data gravity well, and B represents the event that the particular object has a predefined amount of conformed dimension/context objects applied to its data object. This results in the Bayesian probability formula of:

$$P(A \mid B) = \frac{P(B \mid A)P(A)}{P(B)}$$

where:

P(A|B) is the probability that a particular data object will be an appropriate populator of a particular context-based conformed dimensional data gravity well (A) given that (|) a predefined amount of dimension objects are applied to a data object in a conformed dimensional object or a predefined amount of context objects are applied to a data object in a synthetic context-based object (B);

P(B|A) is a probability that the predefined amount of dimension objects are applied to the data object in the conformed dimensional object or the predefined amount of context objects are applied to the data object in the synthetic context-based object (B) given that (|) the data object is assigned to the particular context-based conformed dimensional data gravity well (A);

P(A) is a probability that the particular data object will be the appropriate populator of the particular context-based conformed dimensional data gravity well regardless of any other information; and P(B) is a probability that the particular data object will have the predefined amount of context and/or dimension objects regardless of any other information.

For example, assume that nine out of ten of the data objects that populate a particular context-based conformed dimensional data gravity well have the predefined amount (e.g., 80%) of the context/dimension objects that are on the sides of the particular context-based conformed dimensional data gravity well. Thus, P(B|A)=9/10=0.90. Assume also that the odds that any data object will be an appropriate populator of a particular context-based conformed dimensional data gravity well, regardless of any other information (P(A)), is 0.20, and that the probability that any data object will have the predefined amount of conformed context/dimension objects regardless of any other information (P(B)) is 0.25. The probability that any one data object will be a good populator of a particular context-based conformed dimensional data gravity well (based on these parameters) is 72%:

$$P(A \mid B) = \frac{.90 * .20}{.25} = .72$$

However, if nine out of ten of the conformed dimensional objects that populate a particular context-based conformed dimensional data gravity well still have the predefined amount (e.g., 80%) of the context/dimension objects that are on the sides of the particular context-based conformed dimensional data gravity well (P(B|A)=9/10=0.90), but now the probability that any data object will be an appropriate populator of a particular context-based conformed dimensional data gravity well, regardless of any other information (P(A)), is 25%, and the probability that any data object will have the predefined amount of conformed context/dimension objects regardless of any other information (P(B)) is now 23%, then the probability that any one data object will be a good populator of a particular context-based conformed dimensional data gravity well (based on these new parameters) is 98%:

$$P(A \mid B) = \frac{.90 * .25}{.23} = .98$$

Figure 9:
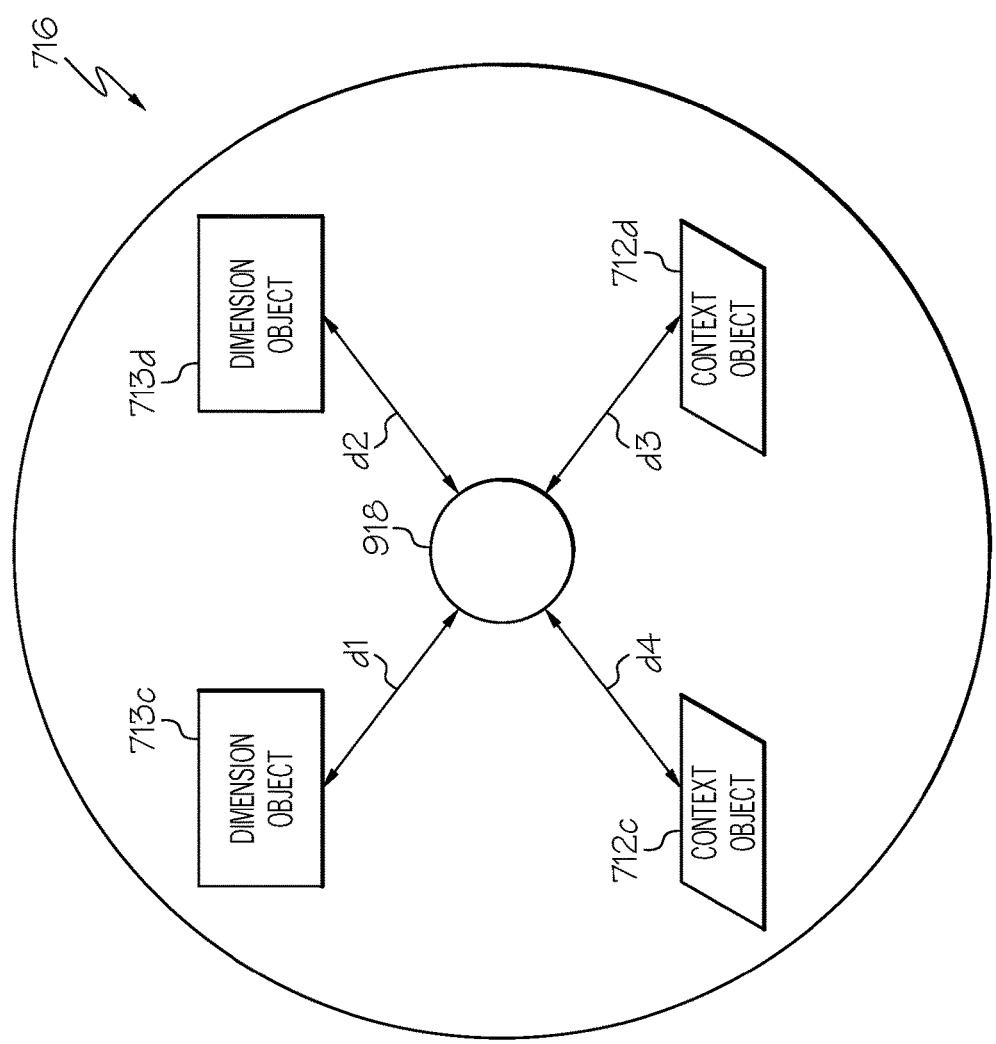
FIGS. 9-13 depict top-views of an exemplary context-based conformed dimensional data gravity well illustrated in FIG. 7.

As depicted in block 818, the displayed appearance of the particular context-based conformed dimensional data gravity well is dynamically adjusted according to how closely each of the multiple parsed synthetic context-based objects matches at least one context object. For example, consider FIG. 9, which presents a top-down view of the context-based conformed dimensional data gravity well 716 depicted in FIG. 7. As in FIG. 7, context-based conformed dimensional data gravity well 716 includes dimension objects 713c and 713d as well as context objects 712c and 712d. For purposes of clarity, the parsed objects 718 shown in FIG. 7 are depicted in FIG. 9 as a single parsed object group 918, which may be made up of 1) a single parsed object, or 2) multiple parsed objects that are associated with one or more of the dimension objects 713c-713d or context objects 712c-712d. As depicted in FIG. 9, parsed object group 918 is equally attracted to dimension objects 713c-713d and context objects 712c-712d, as illustrated by the equal lengths of distances d1-d4. That is, the probability that parsed object group 918 shares facets (i.e., facets are defined as dimension objects and/or context objects) with the depicted dimension objects 713c-713d and context objects 712c-712d is equal.

Figure 10:
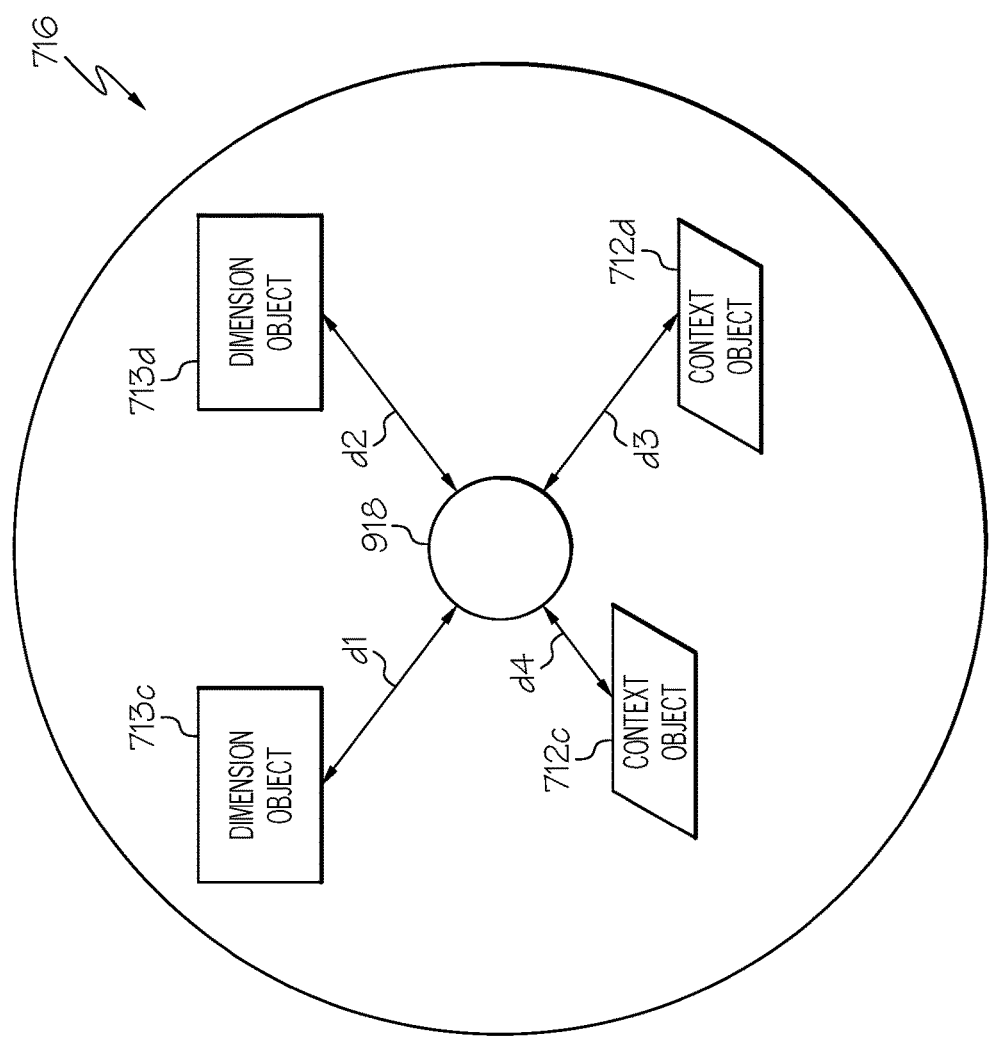

However, in FIG. 10, there is a higher probability that parsed object group 918 shares common descriptive data with context object 712c than with dimension objects 713c-713d and context objects 712d. Thus, in FIG. 10, context-based conformed dimensional data gravity well 716 depicts parsed object group 918 as being closer to context object 712c than dimension objects 713c-713d and context objects 712d (i.e., distance d4 is shorter than any of the other distances d1-d3).

Figure 11:
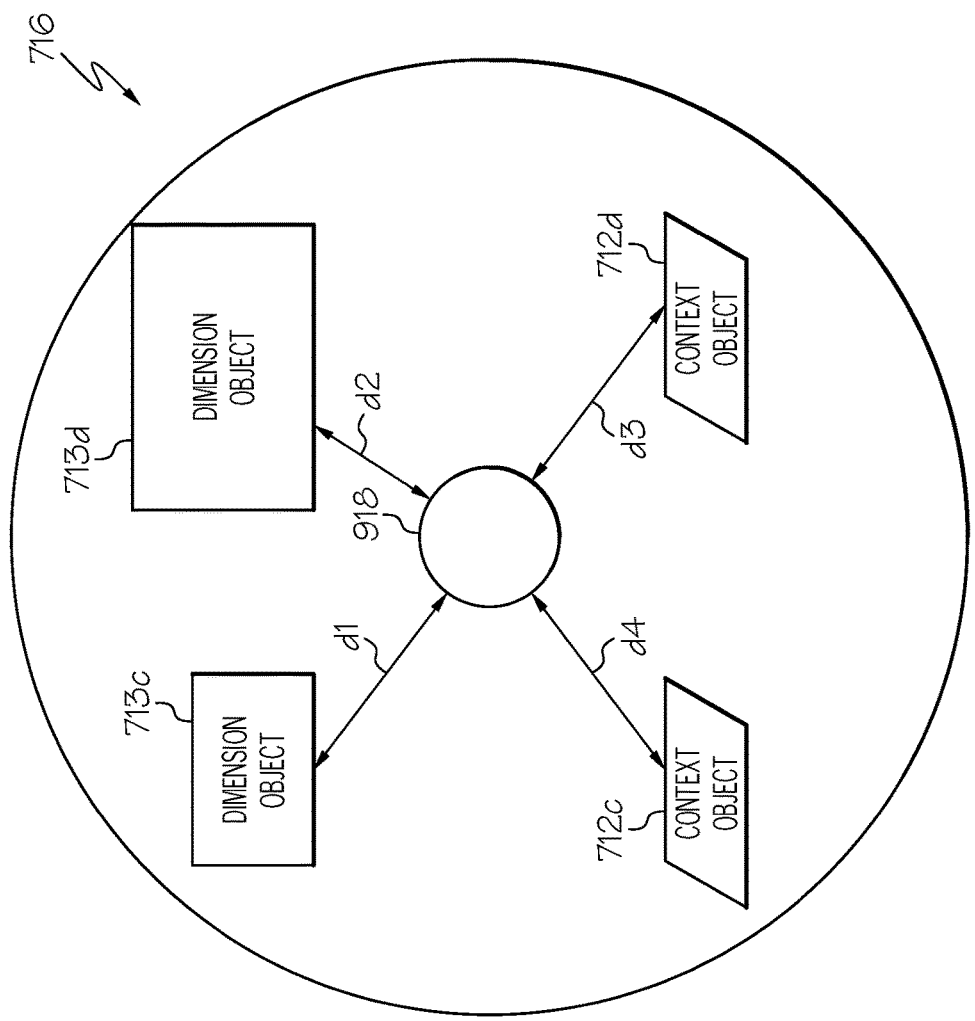

With reference now to FIG. 11, assume for illustrative purposes that the parsed object group 918 is equally attracted to dimension objects 713c-713d and context objects 712c-712d, as depicted in FIG. 9. In this embodiment, a calculation is performed to derive a first derivative d'(PO), where d'(PO) defines a rate of change of how many of the multiple parsed synthetic context-based objects are associated with at least one specific context object in the particular context-based conformed dimensional data gravity well, and wherein the rate of change is represented by a change to a depicted size of the specific context object. That is, assume that dimension object 713d is attracting the parsed objects in parsed object group 918 at an increasing rate that is higher than that of the dimension objects 713c and context objects 712c-712d. As such, this first derivative (i.e., rate of change of how many parsed objects are being attracted to a particular dimension/context object) depicts the temporal (e.g., real-time) increase in the importance (i.e., "attraction") of dimension object 713d. As such, dimension object 713d is depicted as growing larger than the dimension object 713c and context objects 712c-712d.

Figure 12:
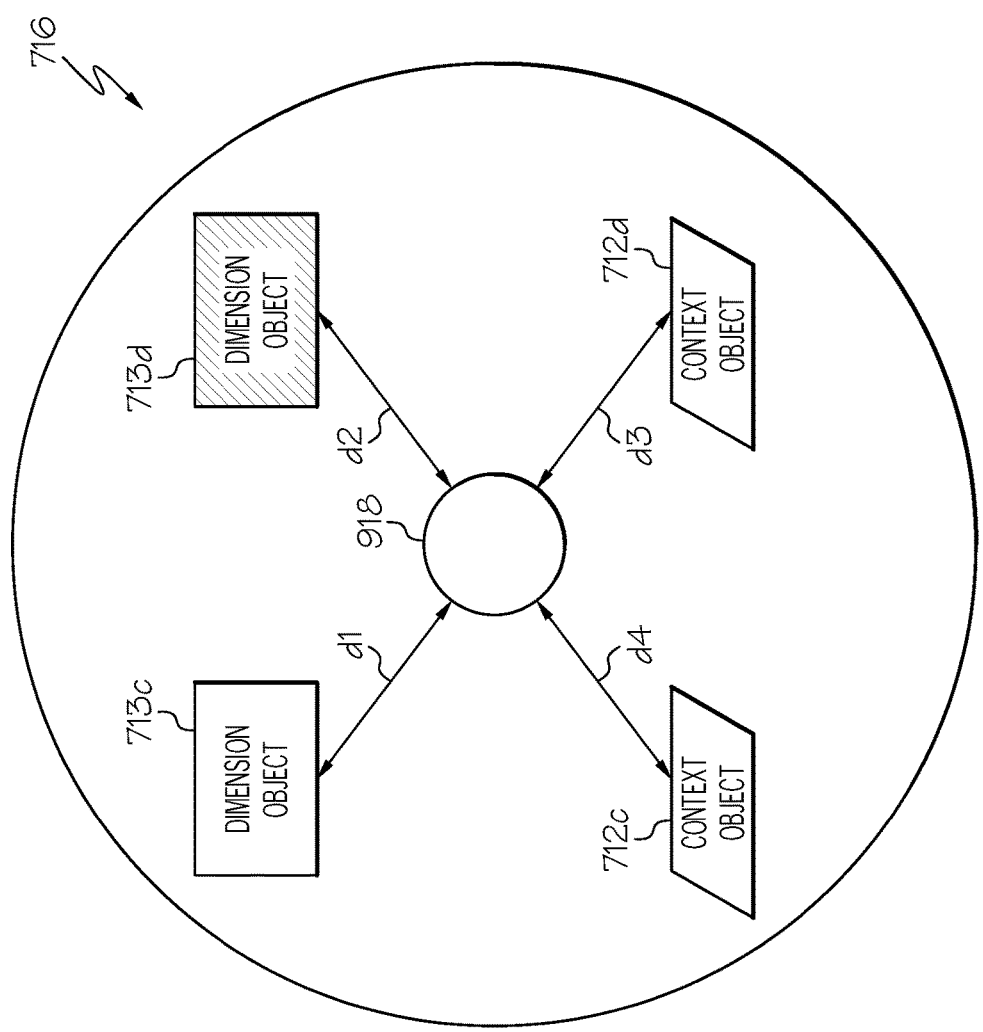

With reference now to FIG. 12, assume that some or all of the dimension objects 713c-713d and context objects 712c-712d are increasingly being associated with objects in parsed object group 918 (i.e., an increasing quantity of objects from the data stream of parsed objects 701 are being pulled by particular dimension objects and/or context objects into context-based conformed dimensional data gravity well 716). However, assume for exemplary purposes that dimension object 713d is increasing its attraction level at a rate that is higher than the dimension object 713c and context objects 712c-712d (i.e., dimension object 713d is attracting more of the parsed objects 701 than dimension object 713c and context objects 712c-712d). In this exemplary embodiment, a second derivative d"(PO) is derived, where d"(PO) defines a rate of change (i.e., to the level of attraction between a specific context/dimension object and objects in the parsed object group 918), which is then illustrated by a change to the depicted size/appearance/shading/etc. of the dimension/context object. That is, in the illustration depicted in FIG. 12, dimension object 713d is increasing its level of effect in pulling parsed dimension objects into context-based conformed dimensional data gravity well 716 at a rate of change that is greater than the dimension objects 713c and context objects 712c-712d. Thus, dimension object 713d is depicted graphically changed (i.e., is now shaded).

Figure 13:
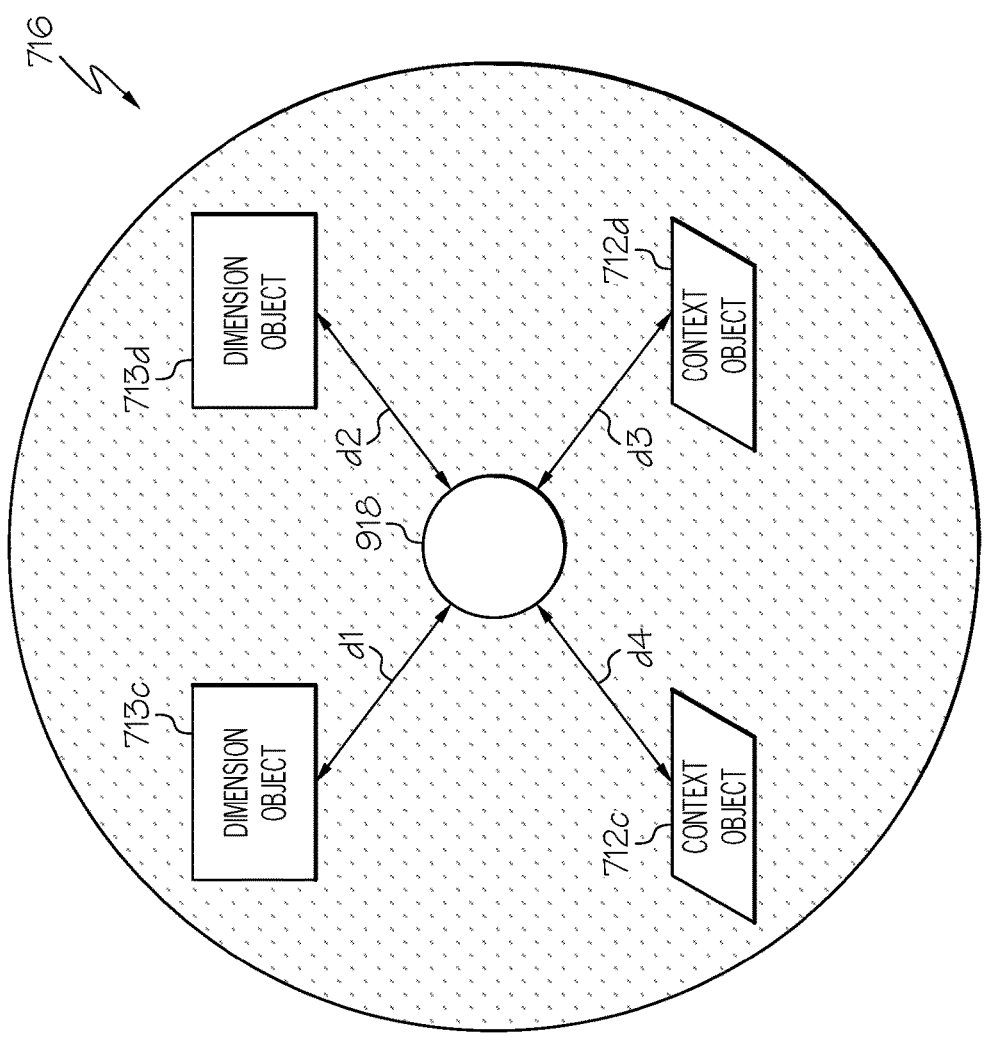

With reference now to FIG. 13, assume that there has been a spike in the level of attraction between one or more of the dimension/context objects (713c-713d/712c-712d) and objects from the data stream of parsed objects 701 (now in the parsed object group 918). This spike is determined by deriving a third derivative d'''(PO), where d'''(PO) defines a spike to this rate of change of attraction, which is illustrated as a change in the depicted appearance of the context-based conformed dimensional data gravity well 716. This spike is due to one or more dimension/context objects showing a significant increase in their rate of change in attraction to the objects in the parsed object group 918. If there is no spike, then this third derivative will be zero. However, if there is a spike, then this third derivative will be a value that is greater than zero. If this value exceeds a predetermined level (e.g., more than 1.0), then the image of the entire context-based conformed dimensional data gravity well 716 will be altered (e.g., shaded, as depicted in FIG. 13).

Returning to FIG. 8, the process ends at terminator block 820.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of measuring and displaying facets in context-based conformed dimensional data gravity wells, the method comprising:

receiving, by one or more processors, a data stream of non-contextual data objects, wherein each of the non-contextual data objects ambiguously relates to multiple subject-matters;

associating, by one or more processors, one of the non-contextual data objects with a context object to define a synthetic context-based object, wherein the context object is a first facet that provides a context that identifies a specific subject-matter, from the multiple subject-matters, of said one of the non-contextual data objects;

parsing, by one or more processors, the synthetic context-based object into a context-based n-tuple, wherein the context-based n-tuple comprises a pointer to said one of the non-contextual data objects, a probability that a non-contextual data object has been associated with a correct context object, and a weighting factor of importance of the synthetic context-based object;

creating, by one or more processors, multiple context-based conformed dimensional data gravity well frameworks on a context-based conformed dimensional data gravity wells membrane, wherein each of the multiple context-based conformed dimensional data gravity well frameworks comprises at least one non-contextual data object and at least one context object, and wherein the context-based conformed dimensional data gravity wells membrane is a virtual mathematical membrane that is capable of supporting multiple context-based conformed dimensional data gravity wells;

calculating, by one or more processors, a virtual mass of a parsed synthetic context-based object, wherein the virtual mass of the parsed synthetic context-based object is derived from a formula of:

$$P_c(C) \times Wt_c(S),$$

where $P_c(C)$ is a probability that the non-contextual data object has been associated with a correct context object, and where $Wt_c(S)$ is the weighting factor of importance of the synthetic context-based object;

transmitting, by one or more processors, multiple parsed synthetic context-based objects to the context-based conformed dimensional data gravity wells membrane;

populating, by one or more processors, each of the multiple context-based conformed dimensional data gravity well frameworks with the multiple parsed synthetic context-based objects to define multiple context-based conformed dimensional data gravity wells according to the virtual mass of multiple parsed synthetic context-based objects that are pulled into each of the context-based conformed dimensional data gravity well frameworks, wherein each of the multiple parsed synthetic context-based objects is pulled into a particular context-based conformed dimensional data gravity well in response to values from its n-tuple matching said at least one context object in said particular context-based conformed dimensional data gravity well; and storing, by one or more processors, the particular context-based conformed dimensional data gravity well for use with future retrieval of each of the multiple parsed synthetic context-based objects pulled therein.

2. The method of claim 1, further comprising:
dynamically adjusting, by one or more processors, a displayed appearance of the particular context-based conformed dimensional data gravity well according to how many parsed synthetic context-based objects are pulled into the particular context-based conformed dimensional data gravity well.

3. The method of claim 2, further comprising:
further dynamically adjusting, by one or more processors, the displayed appearance of the particular context-based conformed dimensional data gravity well according to a first derivative d'(PO), where d'(PO) defines a rate of change of how many of the multiple parsed synthetic context-based objects are associated with at least one specific context object in the particular context-based conformed dimensional data gravity well, and wherein the rate of change is represented by a change to a depicted size of the specific context object.

4. The method of claim 3, further comprising:
further dynamically adjusting, by one or more processors, the displayed appearance of the particular context-based conformed dimensional data gravity well according to a second derivative d"(PO), where d"(PO) defines a rate of change to the depicted size of said at least one specific context object.

5. The method of claim 4, further comprising:
further dynamically adjusting, by one or more processors, the displayed appearance of the particular context-based conformed dimensional data gravity well according to a third derivative d'"(PO), where d'"(PO) defines a spike to the rate of change to the depicted size of said at least one context object.

6. The method of claim 1, further comprising:
receiving, by one or more processors, a data stream of non-dimensional data objects;
applying, by one or more processors, a dimension object to one of the non-dimensional data objects to define a conformed dimensional object, wherein the dimension object is a second facet that provides a measurement scale to the non-dimensional data objects;
parsing, by one or more processors, the conformed dimensional object into a dimensional n-tuple, wherein the n-tuple comprises a pointer to said one of the non-dimensional data objects, a probability that said one of the non-dimensional data objects has been associated with a correct dimensional label, a probability that said one of the non-dimensional data objects is uncorrupted, and a weighting factor of importance of the conformed dimensional object;
transmitting, by one or more processors, multiple parsed conformed dimensional objects to the context-based conformed dimensional data gravity wells membrane;
further populating, by one or more processors, each of the multiple context-based conformed dimensional data gravity well frameworks with the multiple parsed conformed dimensional objects to further define the multiple context-based conformed dimensional data gravity wells according to a virtual mass of multiple parsed conformed dimensional objects that are pulled into each of the context-based conformed dimensional data gravity well frameworks, wherein each of the multiple parsed conformed dimensional objects is pulled into a particular context-based conformed dimensional data gravity well in response to values from its n-tuple matching said dimension object in said particular context-based conformed dimensional data gravity well; and
further dynamically adjusting, by one or more processors, a displayed appearance of the particular context-based conformed dimensional data gravity well according to the virtual mass of a parsed conformed dimensional object.

7. The method of claim 6, further comprising:
calculating, by one or more processors, a virtual mass of a parsed conformed dimensional object, wherein the virtual mass of the parsed conformed dimensional object is derived from a formula of:

$$P_d(C) \times Wt_d(S),$$

where $P_d(C)$ is a probability that 1) said one of the non-dimensional data objects has been associated with the correct dimensional label, 2) said one of the non-dimensional data objects is uncorrupted, and 3) said one of the non-dimensional data objects has come from a data source whose data has been predetermined to be appropriate for storage in a particular dimensional data gravity well; and where $Wt_d(S)$ is the weighting factor of importance of the conformed dimensional object.

8. The method of claim 6, further comprising:
graphically displaying, by one or more processors, the multiple context-based conformed dimensional data gravity wells according to a combined virtual mass of the multiple parsed synthetic context-based objects and the multiple parsed conformed dimensional objects, wherein a first context-based conformed dimensional data gravity well holds a more virtually massive combination of parsed data objects than a second context-based conformed dimensional data gravity well, and wherein the first context-based conformed dimensional data gravity well extends farther away from the context-based conformed dimensional data gravity wells membrane than the second context-based conformed dimensional data gravity well.

9. The method of claim 1, wherein a particular data object is either a conformed dimensional object or a synthetic context-based object, the method further comprising:
determining, by one or more processors, a likelihood that the particular data object is pulled into an appropriate context-based conformed dimensional data gravity well according to a Bayesian probability formula of:

$$P(A \mid B) = \frac{P(B \mid A) P(A)}{P(B)}$$

where:
P(A|B) is the probability that a particular data object will be an appropriate populator of a particular context-based conformed dimensional data gravity well (A) given that (|) a predefined amount of dimension objects are applied to a data object in a conformed dimensional object or a predefined amount of context objects are applied to a data object in a synthetic context-based object (B);
P(B|A) is a probability that the predefined amount of dimension objects are applied to the data object in the conformed dimensional object or the predefined amount of context objects are applied to the data object in the synthetic context-based object (B) given that (|) the data object is assigned to the particular context-based conformed dimensional data gravity well (A);

P(A) is a probability that the particular data object will be the appropriate populator of the particular context-based conformed dimensional data gravity well regardless of any other information; and P(B) is a probability that the particular data object will have the predefined amount of context and/or dimension objects regardless of any other information.

10. The method of claim 1, wherein the weighting factor of importance of the synthetic context-based object is based on how important the synthetic context-based object is to a particular project.

11. The method of claim 1, further comprising:
determining, by one or more processors, that said one of the non-dimensional data objects is uncorrupted by determining that said one of the non-dimensional data objects is not a fragment of an original data object.

12. The method of claim 1, further comprising:
graphically representing, by one or more processors, said at least one context object on a wall of said particular context-based conformed dimensional data gravity well.

13. The method of claim 1, further comprising:
determining, by one or more processors, an age of each synthetic context-based object that has been pulled into the particular context-based conformed dimensional data gravity well; and
removing, by one or more processors, from the particular context-based conformed dimensional data gravity well any data object that is older than a predetermined age.

14. A computer program product for measuring and displaying facets in context-based conformed dimensional data gravity wells, the computer program product comprising a non-transitory computer readable storage medium having program code embodied therewith, the program code readable and executable by one or more processors to perform a method comprising:
receiving a data stream of non-contextual data objects, wherein each of the non-contextual data objects ambiguously relates to multiple subject-matters;
associating one of the non-contextual data objects with a context object to define a synthetic context-based object, wherein the context object is a first facet that provides a context that identifies a specific subject-matter, from the multiple subject-matters, of said one of the non-contextual data objects;
parsing the synthetic context-based object into a context-based n-tuple, wherein the context-based n-tuple comprises a pointer to said one of the non-contextual data objects, a probability that a non-contextual data object has been associated with a correct context object, and a weighting factor of importance of the synthetic context-based object;
creating multiple context-based conformed dimensional data gravity well frameworks on a context-based conformed dimensional data gravity wells membrane, wherein each of the multiple context-based conformed dimensional data gravity well frameworks comprises at least one non-contextual data object and at least one context object, and wherein the context-based conformed dimensional data gravity wells membrane is a virtual mathematical membrane that is capable of supporting multiple context-based conformed dimensional data gravity wells;
calculating a virtual mass of a parsed synthetic context-based object, wherein the virtual mass of the parsed synthetic context-based object is derived from a formula of:

$$P_c(C) \times Wt_c(S),$$

where $P_c(C)$ is a probability that the non-contextual data object has been associated with a correct context object, and where $Wt_c(S)$ is the weighting factor of importance of the synthetic context-based object;

transmitting multiple parsed synthetic context-based objects to the context-based conformed dimensional data gravity wells membrane;
populating each of the multiple context-based conformed dimensional data gravity well frameworks with the multiple parsed synthetic context-based objects to define multiple context-based conformed dimensional data gravity wells according to the virtual mass of multiple parsed synthetic context-based objects that are pulled into each of the context-based conformed dimensional data gravity well frameworks, wherein each of the multiple parsed synthetic context-based objects is pulled into a particular context-based conformed dimensional data gravity well in response to values from its n-tuple matching said at least one context object in said particular context-based conformed dimensional data gravity well; and
storing the particular context-based conformed dimensional data gravity well for use with future retrieval of each of the multiple parsed synthetic context-based objects pulled therein.

15. The computer program product of claim 14, further comprising program code that is readable and executable by the processor for:
dynamically adjusting a displayed appearance of the particular context-based conformed dimensional data gravity well according to how many parsed synthetic context-based objects are pulled into the particular context-based conformed dimensional data gravity well.

16. The computer program product of claim 15, further comprising program code that is readable and executable by the processor for:
further dynamically adjusting the displayed appearance of the particular context-based conformed dimensional data gravity well according to a first derivative d'(PO), where d'(PO) defines a rate of change of how many of the multiple parsed synthetic context-based objects are associated with at least one specific context object in the particular context-based conformed dimensional data gravity well, and wherein the rate of change is represented by a change to a depicted size of the specific context object.

17. The computer program product of claim 16, further comprising program code that is readable and executable by the processor for:
further dynamically adjusting the displayed appearance of the particular context-based conformed dimensional data gravity well according to a second derivative d"(PO), where d"(PO) defines a rate of change to the depicted size of said at least one specific context object.

18. The computer program product of claim 17, further comprising program code that is readable and executable by the processor for:
further dynamically adjusting the displayed appearance of the particular context-based conformed dimensional data gravity well according to a third derivative d'"(PO), where d'"(PO) defines a spike to the rate of change to the depicted size of said at least one context object.

19. A computer system comprising:
a processor, a computer readable memory, and a computer readable storage medium;
first program instructions to receive a data stream of non-contextual data objects, wherein each of the non-contextual data objects ambiguously relates to multiple subject-matters;
second program instructions to associate one of the non-contextual data objects with a context object to define a synthetic context-based object, wherein the context object is a first facet that provides a context that identifies a specific subject-matter, from the multiple subject-matters, of said one of the non-contextual data objects;
third program instructions to parse the synthetic context-based object into a context-based n-tuple, wherein the context-based n-tuple comprises a pointer to said one of the non-contextual data objects, a probability that a non-contextual data object has been associated with a correct context object, and a weighting factor of importance of the synthetic context-based object;
fourth program instructions create multiple context-based conformed dimensional data gravity well frameworks on a context-based conformed dimensional data gravity wells membrane, wherein each of the multiple context-based conformed dimensional data gravity well frameworks comprises at least one non-contextual data object and at least one context object, and wherein the context-based conformed dimensional data gravity wells membrane is a virtual mathematical membrane that is capable of supporting multiple context-based conformed dimensional data gravity wells;
fifth program instructions to calculate a virtual mass of a parsed synthetic context-based object, wherein the virtual mass of the parsed synthetic context-based object is derived from a formula of:

$$P_c(C) \times Wt_c(S),$$

where $P_c(C)$ is a probability that the non-contextual data object has been associated with a correct context object, and where $Wt_c(S)$ is the weighting factor of importance of the synthetic context-based object;
sixth program instructions to transmit multiple parsed synthetic context-based objects to the context-based conformed dimensional data gravity wells membrane;
seventh program instructions to populate each of the multiple context-based conformed dimensional data gravity well frameworks with the multiple parsed synthetic context-based objects to define multiple context-based conformed dimensional data gravity wells according to the virtual mass of multiple parsed synthetic context-based objects that are pulled into each of the context-based conformed dimensional data gravity well frameworks, wherein each of the multiple parsed synthetic context-based objects is pulled into a particular context-based conformed dimensional data gravity well in response to values from its n-tuple matching said at least one context object in said particular context-based conformed dimensional data gravity well; and
eighth program instructions to store the particular context-based conformed dimensional data gravity well for use with future retrieval of each of the multiple parsed synthetic context-based objects pulled therein; and wherein
the first, second, third, fourth, fifth, sixth, seventh, and eighth program instructions are stored on the computer readable storage medium for execution by the processor via the computer readable memory.

20. The computer system of claim 19, further comprising:
ninth program instructions to dynamically adjust a displayed appearance of the particular context-based conformed dimensional data gravity well according to how many parsed synthetic context-based objects are pulled into the particular context-based conformed dimensional data gravity well; and wherein
the ninth program instructions are stored on the computer readable storage medium for execution by the processor via the computer readable memory.

* * * * *